United States Patent [19]
Leslie et al.

[11] Patent Number: 5,541,979
[45] Date of Patent: Jul. 30, 1996

[54] CELL EXTENDER WITH TIMING ALIGNMENT FOR USE IN TIME DIVISION MULTIPLE-ACCESS AND SIMILAR CELLULAR TELEPHONE SYSTEMS

[75] Inventors: Samuel A. Leslie; Michael W. Evans, both of Forest; Robert T. Gordon, Lynchburg, all of Va.

[73] Assignee: Allen Telecom Group, Inc., Solon, Ohio

[21] Appl. No.: 207,879

[22] Filed: Mar. 8, 1994

[51] Int. Cl.$^6$ .................. H04B 7/212; H04J 3/00; H04J 3/06; H04L 7/00

[52] U.S. Cl. .................. 379/60; 379/59; 455/11.1; 455/33.1; 455/33.2; 370/95.3; 370/95.1; 370/97; 370/108

[58] Field of Search ................ 379/59, 60, 63; 455/11.1, 15, 16, 33.1, 33.2, 56.1, 51.1; 370/95.3, 108, 95.1, 97, 103; 375/356

[56] References Cited

U.S. PATENT DOCUMENTS

| | | | |
|---|---|---|---|
| 4,937,812 | 6/1990 | Itoh et al. | 370/97 |
| 5,229,996 | 7/1993 | Bäckström et al. | 370/95.3 |
| 5,268,933 | 12/1993 | Averbuch | 455/54.1 |
| 5,293,380 | 3/1994 | Kondo | 370/108 |
| 5,363,373 | 11/1994 | Nakahara et al. | 370/108 |
| 5,406,561 | 4/1995 | Arai | 370/97 |

*Primary Examiner*—Edward L. Coles, Sr,
*Assistant Examiner*—Fan Lee
*Attorney, Agent, or Firm*—Laff, Whitesel, Conte & Saret, Ltd.

[57] ABSTRACT

A cell extender for use in digital cellular telephone systems comprises a control module, and scanning module, and several traffic modules. The control module bidirectionally repeats the donor cell site control channels. Voice modules therein bidirectionally repeat selected donor traffic channels for mobiles. The voice module amplifies and translates the Reverse Digital Traffic Channel RDTC (transmitted by the mobile). The voice module reframes the Forward Digital Traffic Channel, and advances its timing such that RDTC signals transmitted by the mobile and repeated by the cell extender arrive at the donor with the correct timing alignment. The timing advance compensates for RF path propagation delay between the donor and the cell extender, and for any additional delay through the cell extender. If the voice module determines that the mobile is leaving the cell extender coverage area, it sends a hand-off message returning the mobile to the assigned donor traffic channel.

43 Claims, 12 Drawing Sheets

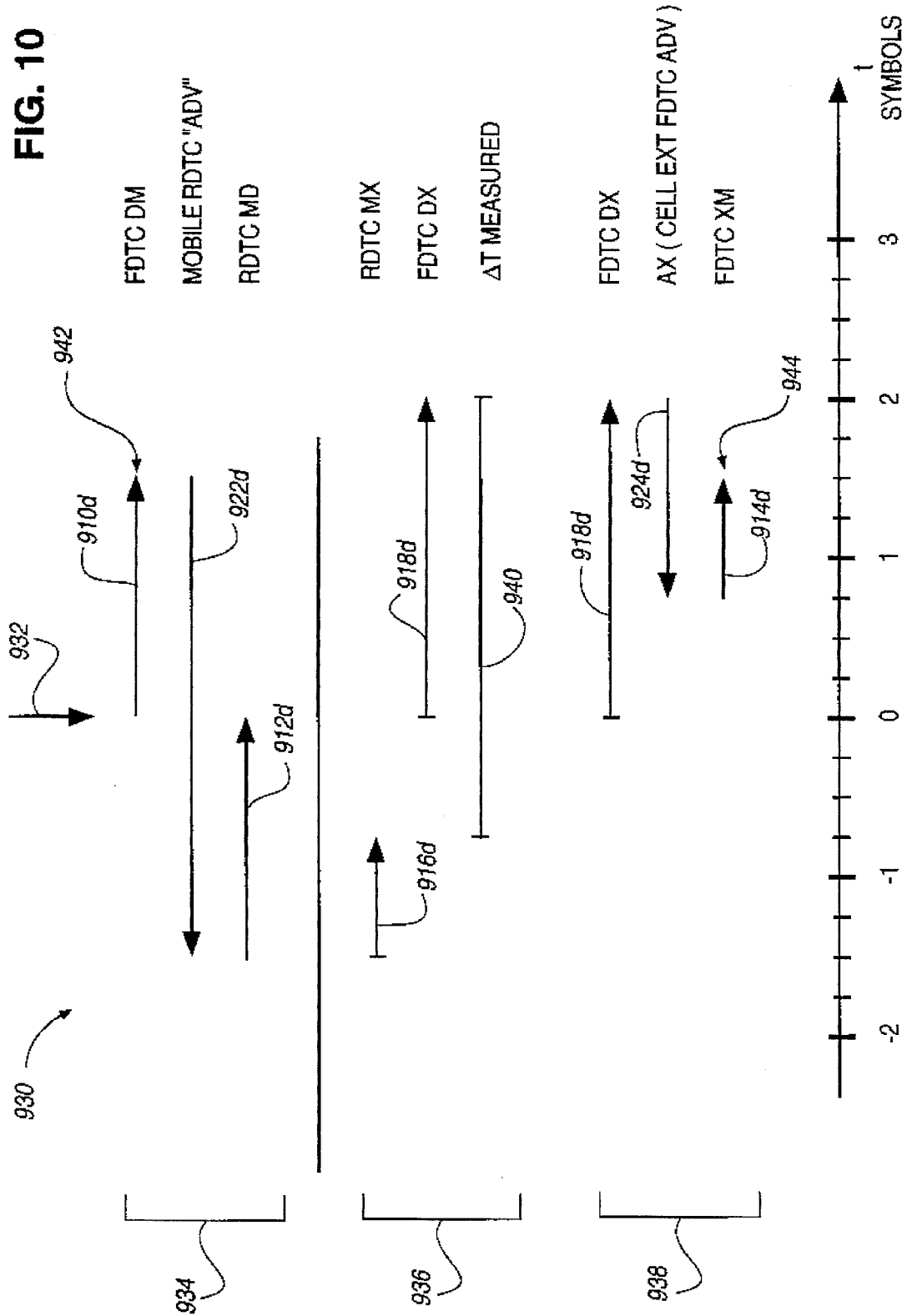

CELL EXTENDER WITH TIMING ALIGNMENT FOR USE IN TIME DIVISION MULTIPLE-ACCESS AND SIMILAR CELLULAR TELEPHONE SYSTEMS

BACKGROUND OF THE INVENTION

This invention relates to cellular radio telephone systems, and more particularly to devices for extending the effective range of a cellular base station used in a digital cellular system, such as a Time Division Multiple Access (TDMA) cellular system, by repeating and frequency-translating one or more channels used by such a base station.

Cellular telephone systems impose limitations on antenna height and transmitter power of base stations to avoid interference among cells and to permit channels to be reused. Although such limitations reduce the effective size of the area which the base station may serve, a small cell size is desirable in those regions of the cellular system in which the density of cells is high.

However, in other regions of the system, it is desirable to enlarge the coverage area of a cell. For example, in regions of low cell density, such as at the periphery of a cellular system or along isolated rural stretches of highway, it may be desirable to provide cells covering a substantially greater area. It is often difficult to provide consistent coverage over a desired large geographic area from a single base station site. Although high antenna height and increased transmitter power may improve coverage, geographic features and other obstructions may obscure the radio signal path. In addition, it is difficult to limit the coverage of a cell to a desired predefined region when high antennas and powerful transmitters are used. One solution to this problem is to divide the desired coverage area into at least two cells and provide a complete additional cellular base station for each cell. However, cellular base station equipment is generally expensive and requires substantial physical space and environmental support.

Accordingly, several "cell-extender" devices have been developed for use in cellular systems for extending the effective coverage area of a cellular base station. A typical cell extender is used to bidirectionally repeat selected channels of a base station (referred to as a "donor cell") at a remote location to improve the communications quality between the donor cell and subscriber terminals over the quality which would be achieved if the donor cell were to communicate directly with subscriber terminals in the vicinity of the remote location. Such cell extenders may employ equipment which is less complex and less expensive than that of the donor cell. Such economy is achieved, at least in part, by operating substantially transparently with respect to the donor cell and the subscriber terminals, and allowing the donor cell to perform in its normal course of operation certain functions which otherwise might be performed by an independent cell site. Thus, the donor cell and the cell extender effectively "share" certain common facilities provided by the donor cell.

In prior art cell extenders designed for use in analog cellular systems, such as the AMPS cellular system used in North America, a cell extender may repeat and translate at least one of the donor cell's control channels and a plurality of the donor cell's voice channels.

A cell extender typically becomes involved in a conversation (i.e. acts as an intermediary between a donor cell and a subscriber terminal) in one of two ways. The subscriber unit may be engaged in an existing conversation, communicating directly with the donor cell, and may travel into the coverage area of the cell extender. Alternatively, the subscriber unit may be within the coverage area of the cell extender and may attempt to originate a call or answer a page while locked onto the cell extender's control channel.

In one prior art embodiment, when a subscriber unit involved in a conversation and communicating directly with a donor cell moves into the coverage area of the cell extender, the cell extender sends a hand-off message to the subscriber unit over the forward voice channel to instruct the subscriber unit to begin using a second voice channel (i.e., one assigned to the cell extender) instead of the voice channel assigned to the donor cell. Then, the cell extender acts as an intermediary by translating and repeating the donor cell voice channel on the second voice channel. The cell extender communicates with the donor cell over the channel originally used by the subscriber unit, and communicates with the mobile over the second voice channel.

Ordinarily, the timing of the repeated signals, and of most instructions to the subscriber unit, is not critical. For example, within a particular cell, a voice channel is used by a single subscriber unit at one time. When involved in a conversation, the subscriber unit is always receptive to hand-off instructions. In addition, since the voice channels are analog signals, the propagation delay through the cell extender's voice channel equipment, and any additional propagation delay introduced by the length of the RF path between the subscriber unit, cell extender, and donor cell, have little if any effect on the operation of the system.

In digital cellular systems, signal timing is more critical. For example, in Time Division Multiple Access (TDMA) systems, in which voice channels are shared by as many as six subscriber units, voice channel transmissions from each subscriber unit must actually arrive at the base station aligned within a predefined time slot to avoid interfering with the signals of other subscriber units. Accordingly, TDMA cellular systems have facilities for measuring the RF path propagation delay and require the subscriber unit to adjust the timing of its transmissions to compensate for such delays such that the transmissions arrive within the predefined time slot. However, the amount of timing adjustment provided by the subscriber unit in TDMA systems is limited. Because the RF path propagation delay cannot exceed that which the subscriber unit can compensate, the limited timing adjustment places a corresponding upper limit on the effective length of the RF path between the base station and the subscriber unit. In TDMA systems, this limit is approximately 92 km. Accordingly, subscriber terminals in TDMA systems may range a maximum of approximately 92 km from the base station.

Prior art cell extenders for use with digital cellular systems, such as TDMA, have been developed, and are largely similar to cell extenders for analog cellular systems. Prior art cell extenders of which we are aware have merely repeated the digital data streams of the TDMA voice channel. As a result, any additional propagation delays introduced by the cell extender equipment, and by the RF path between the cell extender and subscriber terminal, are visible to the base station, and effectively reduce the subscriber terminal-to-base station range.

Another critical timing concern in digital cellular systems is the timing alignment of a hand-off message as received by a subscriber unit. In TDMA systems, hand-off instruction messages are interposed in the forward digital traffic channel (FDTC) data stream received from the base station. In order for a subscriber unit communicating directly with a base station to properly receive a hand-off instruction from a cell extender, the hand-off message must actually arrive at the subscriber unit in precise alignment with the data stream from the base station.

The prior art cell extenders which have been constructed for use with digital cellular systems of which we are aware have not provided for proper alignment of hand-off messages as received by subscriber terminals.

OBJECTS AND SUMMARY OF THE INVENTION

It is therefore an object of the present invention to provide a device for use in digital cellular telephone systems for extending the coverage of a cell site.

It is a further object of the invention to provide a cell extender for use in digital cellular telephone systems which operates transparently with respect to cell site equipment and subscriber terminal (mobile) equipment.

It is another object of the invention to provide a cell extender for use in digital cellular telephone systems which preserves the distance from land-based equipment at which the subscriber terminals may operate.

It is a further object of the invention to provide a cell extender for use in digital cellular telephone systems which allows cascaded cell extender operation.

It is another object of the invention to provide a cell extender for use in digital cellular telephone systems which adjusts the timing of transmissions from subscriber terminals such that when repeated by the cell extender, such transmissions arrive at a base site at a desired time.

It is a further object of the invention to provide a cell extender for use in digital cellular telephone systems which transmits a message instructing a subscriber terminal to perform a hand-off, and which times the message such that the message will arrive within a narrow timing window during which the mobile subscriber terminal is receptive.

A cell extender according to the present invention for use in digital cellular telephone systems comprises a control module, a scanning module, and several traffic modules, which, in cooperation, form a channel translating repeater for digital cellular telephone conversations. The cell extender operates in cooperation with, but substantially transparently to, a donor cell site, and may be located remotely therefrom. The cell extender is allocated a set of cellular operating channels disjoint from that of the donor site.

The control module bidirectionally repeats the donor site control channels. When a subscriber terminal or "mobile" in the cell extender coverage area attempts to access the cellular system (by answering a page or requesting an origination) and is assigned by the donor to a traffic channel, the control module intercepts the assignment message and assigns the mobile to one of the cell extender traffic channels instead. The control module leaves unchanged the time slot assigned by the donor. The control module causes one of the voice modules to translate between the traffic channel to which the mobile was assigned by the cell extender and the channel assigned by the donor cell site.

The voice modules bidirectionally repeat selected donor cell traffic channels for mobiles which are using such channels and are within the cell extender coverage area. Each voice module can tune to any traffic channel in the donor cell channel set and repeat that channel on one of the cell extender traffic channels.

The voice module amplifies and translates the Reverse Digital Traffic Channel RDTC (transmitted by the mobile), but does not otherwise modify it. The voice module controls its reverse path gain to track the strength of the mobile signal. This allows the donor to control the mobile's timing advance and to perform delay spread equalization, avoiding the need to provide these functions in the cell extender.

The voice module reframes the Forward Digital Traffic Channel FDTC, and advances its timing such that RDTC signals transmitted by the mobile and repeated by the cell extender arrive at the donor site with the same timing alignment as they would have if the donor were co-located with the cell extender. The timing advance compensates for RF path propagation delay between the donor site and the cell extender, and for any additional delay through the cell extender. Therefore, the distance between the donor site and the cell extender does not affect the range of the mobile. As a result, the mobile can range up to 92.5 km from the cell extender, and cell extenders can be cascaded.

The voice module also monitors whether an active mobile is moving out of the coverage area of the cell extender, based on the signal strength of the mobile, and on measurements taken by the mobile of the signal strength of the donor site and the cell extender. If the voice module determines that the mobile is leaving the cell extender coverage area, it sends a hand-off message instructing the mobile to switch to the assigned donor cell traffic channel and it ceases to repeat the channel.

The scanning module identifies active mobiles (i.e. engaged in a conversation through the donor site) which are in the cell extender's coverage area and which are therefore candidates for service by the cell extender. The scanning module scans all active channels in the donor channel set and determines whether the mobile is a candidate for service by (1) measuring the strength of the mobile signal; and (2) when available, examining signal strength measurements provided by the mobile for the donor and the cell extender.

When the scanning module determines that an active mobile is within the cell extender coverage area, it attempts to "capture" the mobile by tuning to the donor cell FDTC and sending a hand-off message (while the donor cell is transmitting simultaneously) instructing the mobile to use one of the cell extender traffic channels. If the cell extender signal is substantially stronger than the donor signal, the cell extender signal will effectively override the donor signal, and the mobile will receive and execute the handoff instruction.

In order for the mobile to accept the hand-off message, the cell extender message, as received by the mobile, must be aligned with the donor cell FDTC data stream to a precision of within ¼ symbol. Accordingly, the scanning module times its transmission, taking into account the mobile's apparent distance from the cell extender, based on signal strength measurements and timing comparisons between the cell site FDTC and the mobile RDTC.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 10 is a second diagram illustrating in detail the timing relationships of FIGS. 8-9.

DETAILED DESCRIPTION OF THE PREFERRED EMBODIMENT

Figure 1:
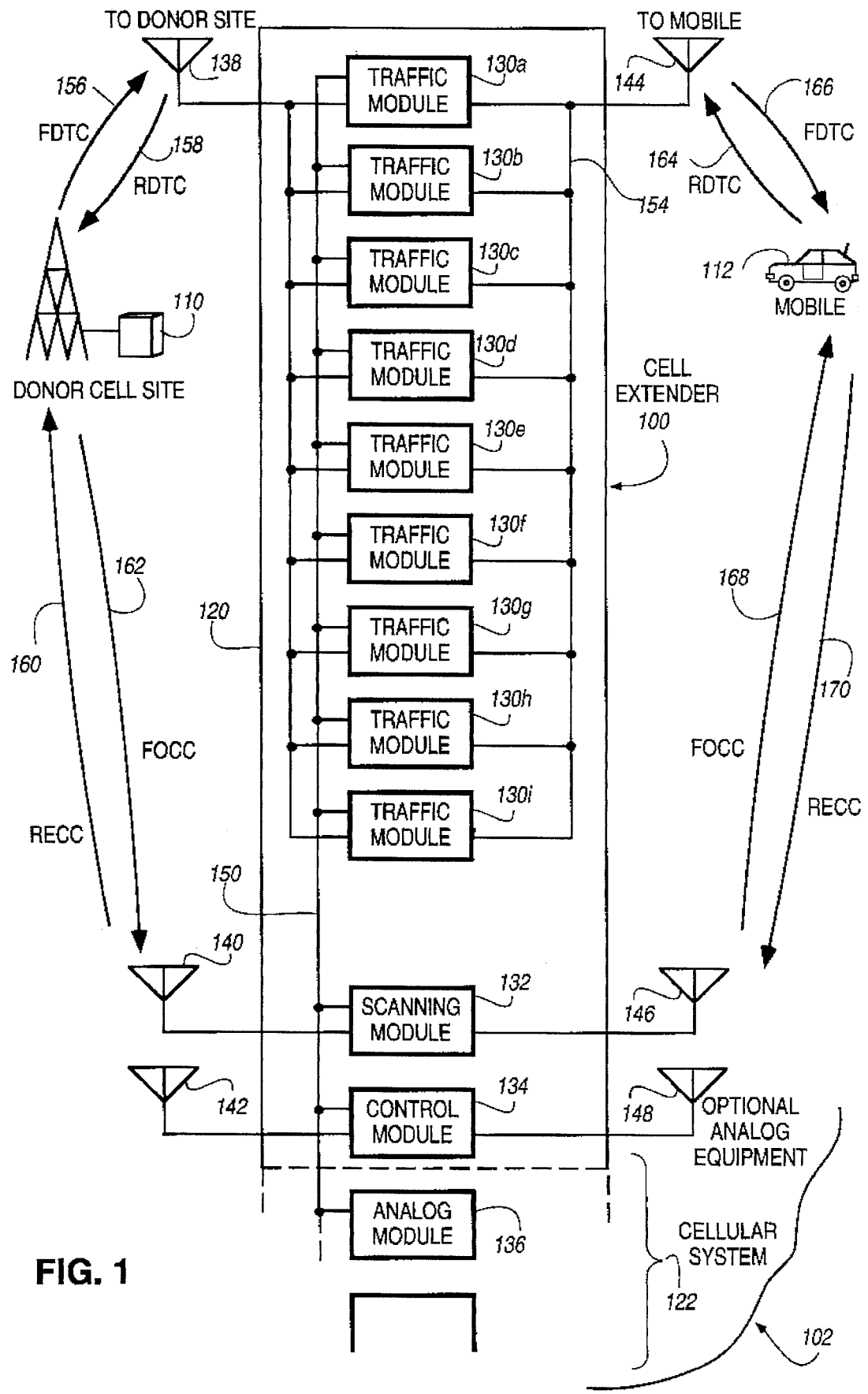
FIG. 1 is a block diagram showing at a summary level a cell extender 100 constructed according to the present invention for use in a TDMA or similar digital cellular telephone system.

A summary block diagram of a cell extender 100 constructed according to the present invention is shown, along with an exemplary operating environment, in FIG. 1. As shown in the drawings and described herein, the exemplary operating environment may comprise a "digital" cellular telephone system 102 having at least one cellular base station 110 and at least one mobile subscriber terminal 112. A cellular base station is sometimes colloquially referred to as a "base site" or "cell site." A base station used with a cell extender may be referred to as a "donor cell site." Subscriber terminals are often installed in vehicles and are therefore frequently referred to as "mobiles." Whenever the term "mobile" is used herein, it shall refer to any suitable cellular subscriber terminal, including fixed and portable terminals, and is not limited to subscriber terminals installed in vehicles.

In order to provide a specific exemplary operating environment, the inventive cell extender 100 is described herein for use in conjunction with the Time Division Multiple-Access digital cellular system as specified in EIA/TIA Interim Specification IS-54-B (April, 1992), published by the Telecommunications Industry Association. However, the present invention may be applied to other digital cellular systems, such as the European "GSM" cellular standard. The invention may also be used in various other communications systems which serve movable subscriber terminals using digital communications channels. One skilled in the art will appreciate how to modify the invention for use in such applications.

The apparatus and methods discussed herein for timing alignment and call processing in a cellular radio telephone system employing a cell extender may also be broadly applicable to a general class of radio systems having a control station and a user station, in which an auxiliary station acts as a communications intermediary or engages in certain other transactions with the control station and the user station. The preferred embodiment of the invention discussed herein, in which a cell extender operates in the environment of a cellular radio telephone system is a particular example of this general class of radio systems. In the cellular radio telephone environment, the donor site or cell acts as the control station, the mobile or subscriber terminal acts as the user station, and the cell extender acts as the auxiliary station. However, one skilled in the art will appreciate that the timing alignment and call processing inventions disclosed herein could also be used in other radio system configurations.

As best seen in FIG. 1, the cell extender 100 comprises at least one traffic module 130, at least one scanning module 132, and at least one control module 134. The cell extender 100 is used to extend the coverage of a donor cell site 110 to a geographical region in which signal levels are too low, or the transmission distance to the donor cell is too large, to provide adequate coverage. The cell extender 100 acts as a channel translating repeater for the donor cell and the mobiles.

Suitable antennas 138, 140, and 142 are connected to the traffic modules 130, scanning module 132, and control module 134, respectively, so that these modules can receive and transmit signals to and from the donor cell site 110. Suitable antennas 144, 146, and 148 are connected to the traffic modules 130, scanning module 132, and control module 134, respectively, so that these modules can receive and transmit signals to and from the mobiles 112. Antennas 138, 140, 142, 144, 146, and 148 are shown as separate antennas to illustrate the signal paths between the cell extender 100, cell site 110, and mobile 112. However, in commercial embodiments, combiners, multiplexers, and other filter devices may be provided to allow the modules of the cell extender 100 to be connected to fewer antennas (or one antenna).

With very limited exceptions, the operation of the cell extender 100 is preferably transparent to both the donor cell and mobile. The cell extender 100 is preferably allocated a set of radio frequency channels as though the cell extender were another cell in the frequency plan. Accordingly, the cell extender channel set is disjoint from the channel set of the donor cell.

The TDMA digital cellular system specified in EIA TIA IS-54-B is a dual-mode analog and digital cellular system which is designed for compatibility with the earlier analog cellular system referred to as Advanced Mobile Phone Service (AMPS). Analog-only mobiles use only analog voice channels. Digital-capable mobiles are usually analog-capable as well, and may use an analog voice channel or a digital voice channel depending on the availability of such channels in a particular cell at the time a conversation begins. Thus, any particular donor cell 110 with which the cell extender 100 is used includes at least one set of control channels which are used by both analog-only and digital-capable mobiles, and a plurality of voice channels which may be analog or digital voice channels according to the needs of the system operator.

Cell extender 100 may likewise be equipped with a combination of analog and digital voice channel modules and associated support modules. Only that subset 120 of the cell extender 100 required to support operation with digital-capable mobiles on digital traffic channels is described herein. However, the cell extender 100 may also include optional analog equipment 122, including one or more analog modules 136, in order to translate and repeat traffic on analog voice channels.

The control module 134 translates and repeats the donor site control channel. The control module 134 receives the Forward Control Channel (FOCC) 162 from the donor site 110 and retransmits it as FOCC 168 for use by mobiles 112 within the coverage area of the cell extender 100. The control module 134 also receives any data transmitted by mobiles on its Reverse Control Channel (RECC) 170 and retransmits it to the donor site 110 via the donor's RECC 160. Both analog and digital mobiles use the FOCC and RECC. In general, an idle mobile scans available FOCCs and locks onto the FOCC of its home or preferred cellular system having the strongest signal. If the mobile is within the coverage area of the cell extender 100, the cell extender's FOCC 168 will be the strongest, and the mobile will lock to it.

If a mobile 112 attempts an origination or registration on the cell extender's RECC 170, the control module 134 retransmits the message to the donor site 110 via RECC 160. The control module also monitors the base site FOCC 162 to detect and intercept any channel assignment messages. Except for channel assignment messages on the FOCC 162, the control module 134 relays the RECC and FOCC control channels transparently.

If the base site 110 assigns the mobile 112 to an analog (AMPS) voice channel, the control module 134 intercepts the assignment message, replaces it with a message assigning the mobile to one of the cell extender's available analog voice channels instead, and instructs one of the cell extender's available analog voice modules 136 to translate the donor-assigned voice channel to the cell-extender-assigned channel. If the base site 110 assigns the mobile 112 to a digital (TDMA) traffic channel, the control module 134 intercepts the assignment message, replaces it with a message assigning the mobile to one of the cell extender's available TDMA traffic channels instead, and instructs one of the cell extender's available traffic modules 130 to translate the donor-assigned traffic channel to the cell-extender-assigned traffic channel.

When the base site 110 assigns a mobile 112 to a digital traffic channel, the assignment also includes a TDMA time slot assignment. The cell extender does not modify this time slot assignment. Although trunking efficiency and channel utilization might be improved by reassigning time slots, such reassignment would increase complexity, requiring facilities for buffering and interchanging the time slots of each channel.

The scanning module 132 is responsible for detecting whether any TDMA mobiles using donor cell channels are in the coverage area of the cell extender, and for sending such mobiles an appropriate hand-off message assigning the mobile to a cell extender traffic channel. The scanning module 132 includes a scanning receiver which can tune all of the traffic channels allocated to the donor cell. The scanning receiver continuously scans all active donor-cell channels to determine which mobiles in the donor cell are candidates for service by the cell extender (i.e. are within the coverage area of the cell extender). The scanning module 132 determines whether a particular mobile is within the cell extender coverage area by: (1) measuring the strength of the mobile's RDTC signal as received by the scanning module; (2) comparing the relative timing between the FDTC received from the donor site and the RDTC received from the mobile; and (3) when available, examining Mobile Assisted Hand Off (MAHO) messages indicating the relative signal strengths of the donor site and the cell extender, as measured by the mobile and returned to the cell site via the RDTC.

For each active mobile determined to be within the cell extender's coverage area for which there is an available channel and slot, the scanning module 132 attempts to "capture" the mobile by transmitting a hand-off message to the mobile on the donor cell FDTC 156 which is occupied by that mobile. Since the donor site 112 is also transmitting on that FDTC 156, the signal from the cell extender 100 must be strong enough to override the signal from the donor site 112 in order to accomplish the "capture." The ratio between the strengths of the signals received by the mobile from the cell extender and the donor cell is referred to as the "capture ratio" and is typically expressed in decibels (dB). Ordinarily, the cell extender's signal must be at least 6 dB stronger than the donor site's signal to ensure a reliable capture. That is, the capture ratio must ordinarily exceed 6 dB.

Since an unsuccessful capture attempt may cause both the donor site's signal and the cell extender's signal to be incorrectly received, and such interference may degrade the audio quality of the donor-cell-to-mobile link, the scanning module 132 preferably employs hysteresis in its candidate detection algorithm to avoid attempting to capture mobiles which are only marginally within the cell extender coverage area.

As noted above, the scanning module 132 sends a hand-off message to the mobile on the donor cell FDTC in an attempt to override the signal which the mobile is receiving from the donor cell. The message is sent via the Fast Associated Control Channel (FACCH) by replacing the user data normally present on the FDTC during the mobile's time slot with an appropriately formatted message. In order for the mobile to accept the FACCH hand-off message, the message, as received by the mobile, must be aligned with the donor cell FDTC data stream with an alignment error of less than ¼ symbol. Accordingly, the scanning module times its transmission, taking into account the mobile's apparent distance from the cell extender, based on signal strength measurements and timing comparisons between the cell site FDTC and the mobile RDTC. The timing of this transmission is described further in detail in the discussion of FIGS. 8–10.

Each traffic module 130 can tune to any of the channels of the donor cell and can bidirectionally repeat that donor channel on one of the channels allocated to the cell extender 100. Preferably, a plurality of traffic modules 130 are provided so that several subscribers may be served simultaneously.

In ordinary operation (i.e., during a call in which the donor cell 110 and the mobile 112 are communicating directly), the donor cell 110 transmits voice and signalling information to the mobile 112 via a Forward Digital Traffic Channel (FDTC) 156 and receives voice and signalling information from the mobile via an associated Reverse Digital Traffic Channel (RDTC) 158 (according to regulatory and industry standards, each Forward channel is paired with an associated Reverse channel).

When the donor cell and the mobile 112 are communicating through the cell extender 100, the cell extender 100 assigns the mobile to operate on one of the available cell extender traffic channel pairs and enables a selected traffic module 130. The traffic module 130 receives voice and signaling data from the donor cell 110 via the donor cell's FDTC 156, and retransmits the data to the mobile via the cell extender's FDTC 166. The traffic module 130 receives voice and signaling data from the mobile 112 via the cell extender's RDTC 164, and retransmits it to the donor cell 110 via the donor cell's RDTC 158.

TDMA cellular systems permit up to three or six mobiles to share each channel. Each mobile assigned to a particular channel within a given cell transmits on the RDTC 164 only during one or two unique predetermined slots within a six-slot frame. The RDTC transmissions from each mobile must be synchronized such that the transmissions arrive at the cell site 110 at the correct time. Since the distance between each mobile and the cell site varies, the radio-frequency path propagation delay also varies. The mobile synchronizes its timing based on the FDTC signal received from the cell site. Thus, in large diameter cells, if not corrected in some manner, the RF path propagation delays would cause the RDTC transmissions from the mobiles to arrive at the cell site at the wrong time. As a result, the cell site could be unable to properly synchronize to the RDTC transmission, or portions of the RDTC transmissions from two mobiles could arrive simultaneously.

Accordingly, the cell site 110 instructs each mobile to advance its timing (i.e. to begin transmitting earlier) to compensate for the propagation delay introduced by the RF path. The cell site 110 can instruct the mobile to advance its timing by 0 to 30 "counts," where a count is equal to one half of the TDMA symbol period of 41.2 microseconds. At the maximum timing advance, the mobile begins RDTC messages approximately 617 microseconds early, which is sufficient to compensate for the round-trip propagation delay introduced when a mobile is approximately 92 km from the base station. Although this maximum mobile timing advance effectively limits the operating range of mobiles in a TDMA cellular system to a radius of 92 km about the base station, as a practical matter, the operating range is typically substantially smaller due to topography and to limitations on transmitter power and antenna height.

Figure 5:
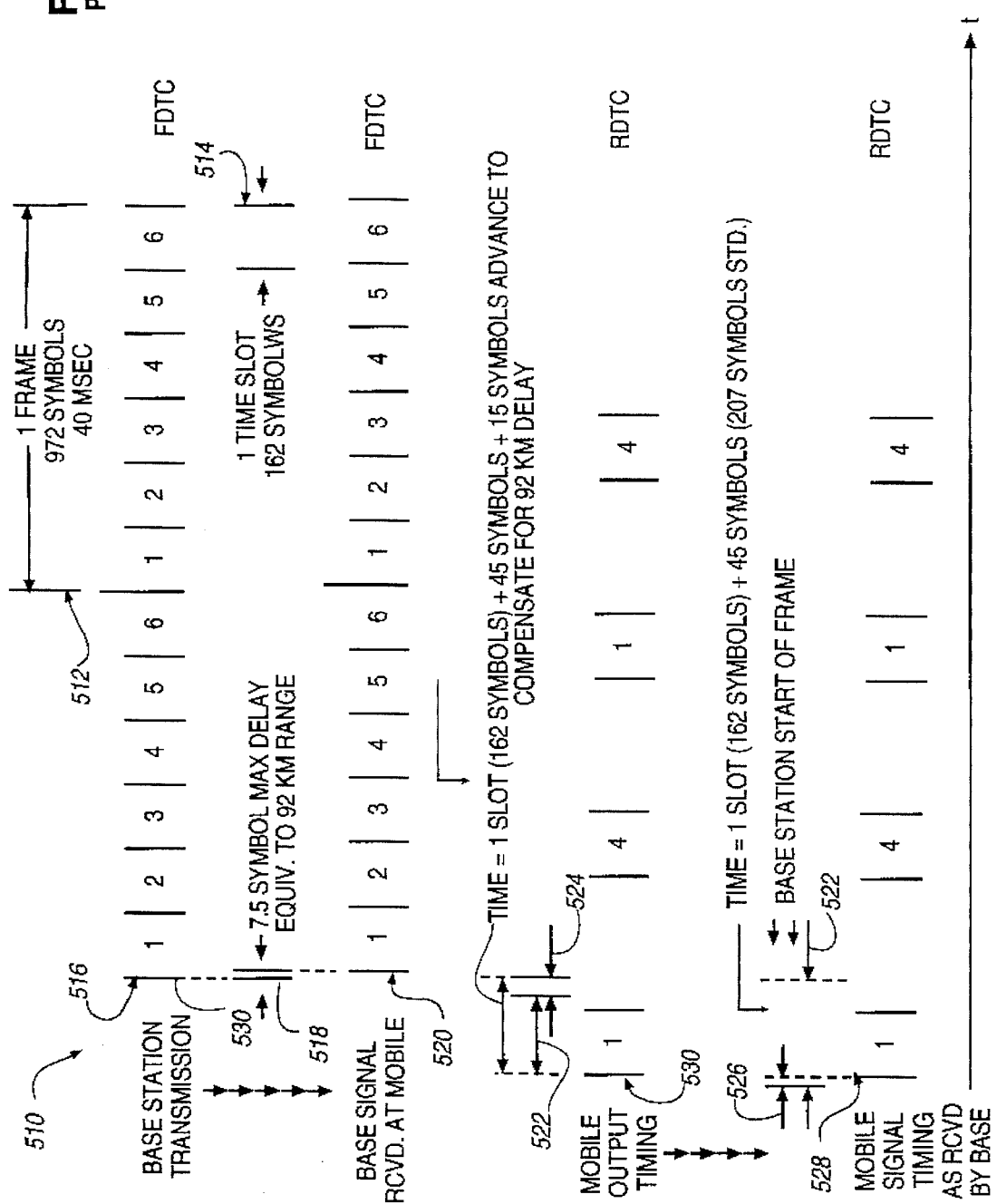
FIG. 5 is a diagram showing the relative timing of certain communications signals produced by an exemplary TDMA digital cellular telephone base station and an exemplary TDMA subscriber terminal in direct communication with one another.

The mobile timing advance feature is best seen in FIG. 5, which presents a timing chart 510 showing the relative timing of FDTC data transmissions from a cell site to a mobile, and RDTC data transmissions from the mobile to the cell site. Although the mobile timing advance feature is specified in EIA/TIA Interim Specification IS-54-B, it is described here in order to aid in understanding certain other timing relationships upon which proper operation of cell extender 100 depends.

The FDTC data stream comprises a plurality of periodically adjacent TDMA frames 512. Each frame 512 comprises six periodically adjacent time slots 514 of equal length. Each time slot 514 comprises 162 serially adjacent symbols of equal length. Thus, each frame 512 contains 972 symbols. The time period for each frame is defined by EIA/TIA Interim Specification IS-54-B as 40 ms. Thus, each time slot is 6.66 ms long, and each symbol is approximately 41.15 microseconds long.

A two-frame excerpt of the FDTC signal transmitted by a base station is designated 516. Reference number 530 denotes the time at which the cell site begins transmission of the first FDTC frame. For illustration, the mobile is located at its maximum range from the base station of 92 km, resulting in a propagation delay 518 due to the length of the RF transmission path equivalent to 7.5 symbols. Accordingly, the beginning of the first FDTC frame 520 arrives at the mobile 7.5 symbols after transmission. The mobile bases its timing synchronization upon the FDTC signals received from the base station.

EIA/TIA IS-54-B specifies that the mobile transmit RDTC data advanced (with respect to the FDTC data received from the cell site) by a standard advance interval 522 of 207 symbols (1 slot (162 symbols)+45 symbols), plus a variable mobile advance parameter 524 set by instruction from the cell site. The mobile advance parameter 524 is generally selected to be equal to the round-trip propagation delay between the cell site and the mobile. Accordingly, in this example, the mobile advance parameter 524 would be 2×7.5=15 symbols, and the mobile's total timing advance would be 222 symbols.

The mobile begins transmitting its RDTC frame 530 an interval of 222 symbols before the beginning of the FDTC frames received from the base station. The mobile transmits only in its assigned slots, in this example, slots 1 and 4. Although the mobile's RDTC timing is described as being "advanced" with respect to the timing of the base station FDTC, in fact, the mobile has already synchronized to FDTC signals previously received from the base station. Since the frames are periodically adjacent, the mobile can determine when to begin transmitting its RDTC frame by delaying for an appropriate interval (one frame minus the total advance) from the beginning of the previously received FDTC frame. The RDTC frame transmitted by the mobile experiences a RF path propagation delay 526 of 7.5 symbols. As best seen in FIG. 5, the mobile RDTC frame 528 is actually received at the cell site 207 symbols prior to the beginning of the base station FDTC frame, as required by EIA/TIA IS-54-B. Thus, the mobile advance parameter, when properly selected, enables the mobile to compensate for RF path propagation delays such that its RDTC transmissions actually arrive at the cell site at the desired times despite such propagation delays.

When the donor site 110 and the mobile 112 are communicating through the cell extender 100, propagation delays are produced in the RF paths between the donor site 110 and the cell extender 100, and in the RF paths between the cell extender 100 and the mobile 112. Additional unavoidable delay is produced in the circuitry of the cell extender 100 itself. In order to prevent the donor site 110 from observing this additional delay, the traffic module 130 "advances" the timing of its transmitted FDTC 166, with respect to the FDTC 156 received from the donor site 110, by an amount equivalent to the round-trip donor-site-to-cell-extender propagation delay, plus any additional delay introduced by the circuitry of the cell extender 100. Because of this compensation, only the propagation delay introduced by the cell-extender-to-mobile RF path is visible to the donor site 110.

This compensation provides several advantages. It allows the donor site 110 to continue to control the mobile's timing advance according to the perceived propagation delay, just as if the mobile were in direct communication with the donor site. This avoids the need to modify the donor site, and also avoids the need to provide duplicate facilities in the cell extender to control the mobile's advance. The donor site 110 continues to receive accurate information concerning the mobile's range from base station serving it (i.e. the cell extender), enabling the donor site to better determine when a handoff to a different cell is required. In addition, the mobile's operating range is not reduced by the distance between the donor site 110 and the cell extender 100 as it would be if this compensation were not provided; the mobile can range up to 92 km from the cell extender.

FDTC and RDTC data exchanged between a base station and a particular mobile appears in one or two slots per frame, depending on whether the mobile is equipped for half-rate or full-rate operation, respectively. The data appears in the same slot or slots in each frame; for full-rate mobiles, the two slots in each frame are displaced by three slots (i.e., a full rate mobile will use slots 1 and 4, 2 and 5, or 3 and 6). Accordingly, slots assigned to a full rate mobile recur every three slot periods, and slots assigned to half rate mobiles recur every six slots.

In general, the traffic module 130 receives voice and signalling data from the donor site 110 via FDTC 156 and retransmits it to the mobile 112 via FDTC 166. As noted above, the traffic module "advances" the timing of its FDTC 166 transmission, with respect to the timing of the FDTC 156 received from the donor site, to compensate for the propagation delay introduced by the cell extender 100. However, the traffic module 130 cannot retransmit the FDTC information to the mobile before it actually receives it from the donor site 110.

Instead the traffic module 130 delays retransmission of the FDTC data stream to the mobile by an amount approximately equal to the slot recurrence interval for the mobile (i.e. three time slot periods for full rate mobiles and six time slot periods for half rate mobiles), less the necessary timing advance required to compensate for the propagation delays. Because the FDTC slots assigned to any given mobile recur at regular intervals, the traffic module 130 achieves the desired timing "advance" by storing the FDTC data in a buffer, and retransmitting it, on a delayed basis with respect to the current time slot, but genuinely advanced with respect to the next arriving donor site FDTC time slot assigned to that mobile.

The cell extender timing advance parameter is selected to compensate for the two-way RF path propagation delay introduced by the distance between the donor site 110 and the cell extender 100, for the delay through the cell extender, and for the propagation path to the middle of the hand-out zone. The mobile uses the FDTC 166 signal received from the cell extender to synchronize the timing of its transmitted RDTC 164 signal so that the RDTC signal arrives at the cell site at the correct time. As a result of the cell extender timing advance feature, the mobile RDTC signal is properly synchronized so that it arrives at the donor site aligned as if the donor were co-located at the cell extender, despite the additional propagation delays introduced by the cell extender and the donor site to cell extender RF path.

Figure 6:
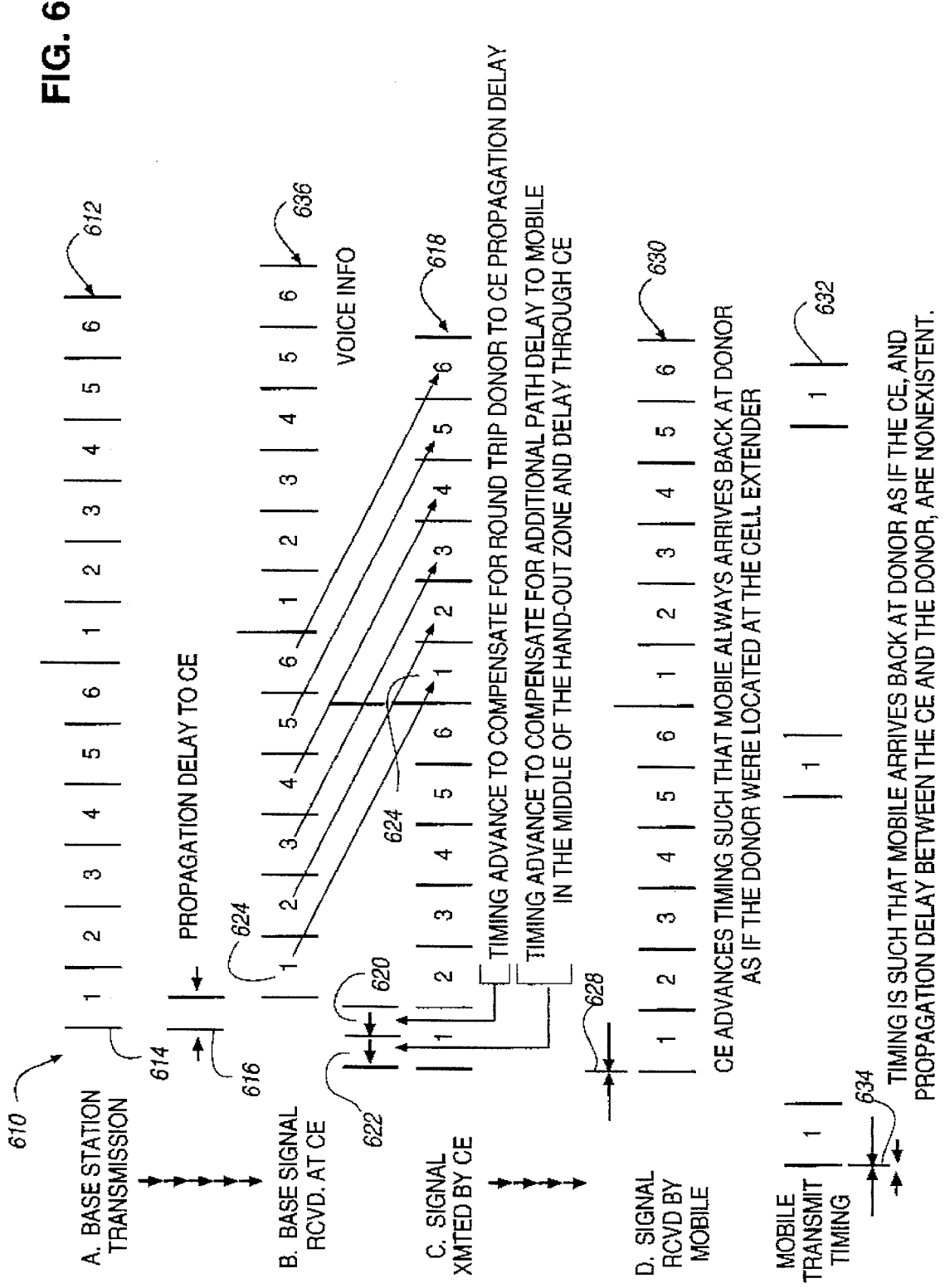
FIG. 6 is a diagram showing the relative timing of certain communications signals produced by an exemplary TDMA digital cellular telephone base site, an exemplary TDMA subscriber terminal, and the cell extender 100 of FIGS. 1-4, wherein the cell extender 100 operates as an intermediary to enable communications between the base station and the subscriber terminal.

The cell extender 100 timing advance feature is best seen in FIG. 6, which presents a timing chart 610 showing the relative timing of the FDTC data transmissions from a cell site, through the cell extender 100, and to a mobile. The chart similarly shows the timing of the RDTC data transmissions from the mobile resulting from the timing advance.

A two-frame excerpt of the FDTC signal transmitted by a base station is designated 612. Reference number 614 denotes the time at which the cell site begins transmission of the first FDTC frame. This transmission experiences a propagation delay 616 proportional to the length of the RF path between the donor cell and the cell extender 100. The FDTC signal, as received at the cell extender 100, is designated 636. The FDTC signal retransmitted by the cell extender 100 is designated 618.

As best seen in FIG. 6, the retransmitted FDTC signal is delayed by a period equal to the slot recurrence interval (here, one frame or six slots) minus the cell extender timing advance parameter. (The example shown in FIG. 6 is for a half-rate mobile, which transmits and receives during a single slot in each frame; for a full-rate mobile, which transmits and receives during two slots in each frame, the signal would be delayed by a period of three slots minus the cell extender timing advance parameter.) Thus, a particular slot 624 of FDTC 636 appears delayed by nearly one frame when retransmitted as FDTC 618. This slot delay, which could be as much as 40 ms, is small compared to the 200 ms delay introduced by the vocoders specified for use in TDMA cellular systems, and is unlikely to be noticed by subscribers.

As best seen in FIG. 6, the cell extender timing advance parameter includes two components. A first component 620 includes the timing advance needed to compensate for the round-trip donor to cell extender RF path propagation delay. A second component 622 includes the timing advance needed to compensate for the delay through the cell extender voice module 130 and the propagation delay of a hypothetical mobile at the center of the hand-out zone. The reverse path delay through the cell extender is typically about 80 microseconds.

Propagation delay between the cell extender and the mobile is compensated by advancing timing in the mobile, which is set by the donor cell. The FDTC 618 signal transmitted by the cell extender to the mobile experiences a propagation delay 628. The FDTC signal, as received by the mobile, is designated 630. The mobile uses the received FDTC signal 630 to control the timing of its transmitted RDTC signal 632. The cell extender advance feature could reduce the effective delay caused by the insertion of the cell extender to zero. Therefore, the cell extender may be effectively transparent to both the mobile and the donor site. The donor site continues to control the mobile's timing advance parameter (which compensates for the round-trip mobile-to-cell-extender propagation delays 628 and 634). In practice, rather than reduce the cell extender delay to zero, the delay is set so that a hypothetical mobile in the middle of the hand-out zone would have the same timing advance whether it is transmitting through the cell extender or directly to the donor cell. This setting insures that when the mobile is handed-out, the donor cell will experience a jump in the received timing of the RDTC signal of less than ±2.0 symbols.

Figure 7:
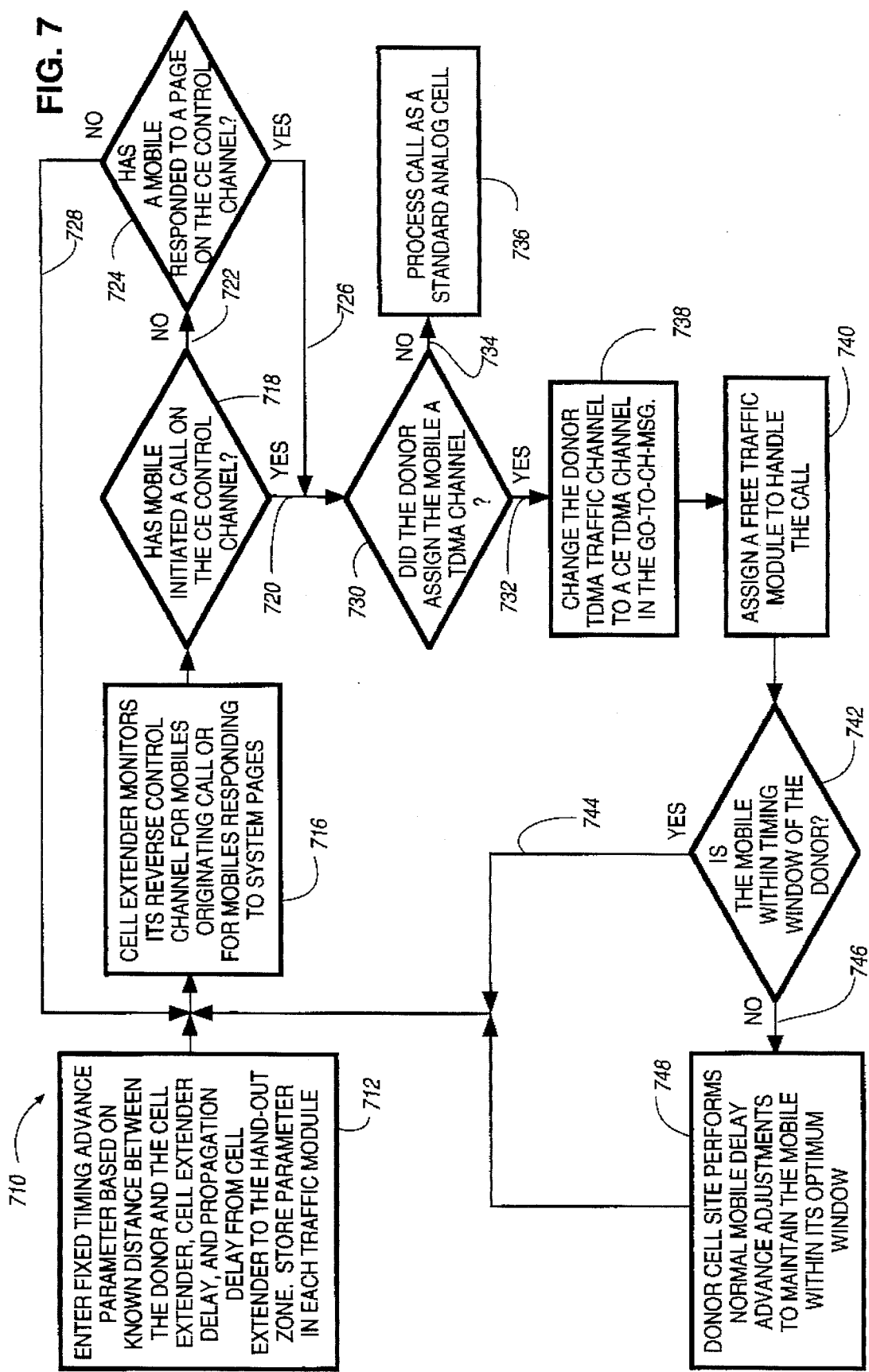
FIG. 7 is a flow diagram illustrating a call processing method including the determination of a first timing advance parameter used by the inventive cell extender 100 of FIG. 1 to provide proper synchronism in communications between the subscriber terminal and the base station.

FIG. 7 is a flow diagram illustrating a call processing method 710 including the determination of a first timing advance parameter used by the inventive cell extender 100 of FIG. 1 to provide proper synchronism in communications between the subscriber terminal and the base station. The method 710 of FIG. 7 is used in situations where the mobile originates or receives a call while in the coverage area of the cell extender 100—i.e., method 710 is used when the mobile attempts to originate a call, or answer a page, using the the cell extender's Reverse Control Channel (RECC) 170.

As best seen in FIG. 7, method 710 begins at step 712, in which certain parameters dependent on the location of the cell extender are initialized. In step 712, a fixed timing advance component 620 (FIG. 6), calculated from the known distance between the cell extender and the donor site, the cell extender delay, and the propagation delay from the cell extender to the middle of the hand-out zone, is entered into the cell extender, Step 712 is generally needed only at the time the cell extender is installed. However, it may be necessary to perform step 712 again if either the cell extender or the donor cell are relocated.

Once the timing advance component 620 has been initialized and stored in the traffic modules, the cell extender performs step 716, in which it monitors its reverse control channel (RECC) to detect attempts by mobiles to originate a call or respond to a page. In step 718, the cell extender determines whether a mobile is attempting to originate a call. If the mobile is attempting to originate, the cell extender takes branch 720 and execution continues in step 730. If the mobile is not attempting to originate, the cell extender takes branch 722, and execution continues in step 724. In step 724, the cell extender determines whether a mobile is attempting to answer a page. If the mobile is attempting to answer, the cell extender takes branch 726 and execution continues in step 730. If the mobile is not attempting to answer, the cell extender takes branch 728, and the process resumes at step 716. (The cell extender is interested in only those RECC messages which reflect an origination or answer).

In step 730, the cell extender examines the FOCC message from the donor to determine whether the mobile has been assigned a TDMA channel. If not, the cell extender takes branch 734, and execution continues in step 736, in which the cell extender processes the call as a standard analog call. However, if the mobile has been assigned a TDMA channel, then the cell extender takes branch 732, and execution continues in step 738.

In step 738, the cell extender assigns the mobile to one of the cell extender's available digital traffic channels by changing the donor's "Go-To-Channel" message. In step 740, the cell extender assigns an available Traffic Module module to handle the call. The assigned Traffic Module begins to translate between the digital traffic channel to which the mobile was assigned by the cell extender and the channel assigned by the donor cell site. The cell extender uses the timing advance parameter determined in step 712 in retransmitting the forward data traffic channel FDTC.

In step 742, the donor cell inspects the reverse digital traffic channel RDTC received from the mobile, as repeated by the cell extender with the previously calculated timing advance, to determine whether the timing of that channel is within the donor cell's timing window. If the timing is correct, branch 744 is taken, and the process returns to step 716. If the timing is incorrect, branch 746 is taken. In step 748, the donor cell performs any necessary fine tuning adjustments to maintain the mobile's timing within the donor cell's timing window. Such adjustment is performed by adjusting the mobile's timing advance parameter 524 (FIG. 5) using existing facilities of the donor cell and mobile, and occurs without intervention by the cell extender. In step 716, the cell extender again monitors its reverse control channel (RECC) to detect additional attempts by mobiles to originate a call or respond to a page.

The method 710 of FIG. 7 is used in situations where the mobile originates or receives a call while in the coverage area of the cell extender 100. A different method is used for calculating a second timing parameter required to enable a mobile, which already has a call established through the donor cell and is moving into the coverage area of the cell extender, to use the cell extender as an intermediary.

As discussed previously, the scanning module 132 sends a hand-off message to the mobile on the donor cell FDTC in an attempt to override the signal which the mobile is receiving from the donor cell. In order for the mobile to accept the hand-off message, the message (as received by the mobile) must be aligned with the donor cell FDTC data stream with an alignment error of less than ¼ symbol. Accordingly, the scanning module times its transmission, taking into account the mobile's apparent distance from the cell extender, based on signal strength measurements and timing comparisons between the cell site FDTC and the mobile RDTC. The timing of this transmission is best seen in FIGS. 8–10.

Figure 8:
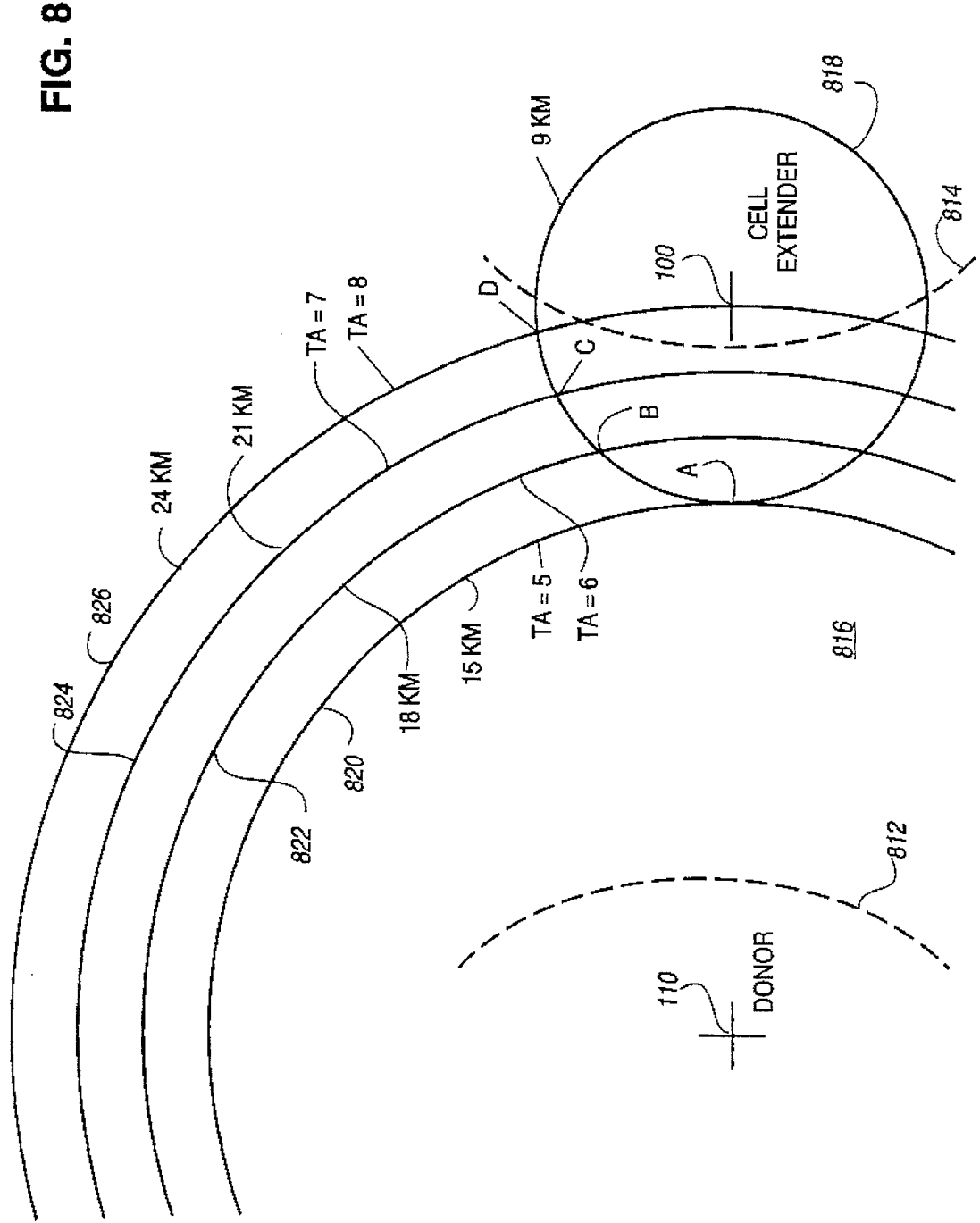
FIG. 8 is a diagram illustrating certain communications signal timing relationships between the base station, subscriber terminal, and the cell extender, which may vary depending on the relative positions of these elements, and which must be taken into account when a subscriber terminal in direct communications with a base station is to begin using the cell extender as an intermediary, or vice versa.
Figure 9:
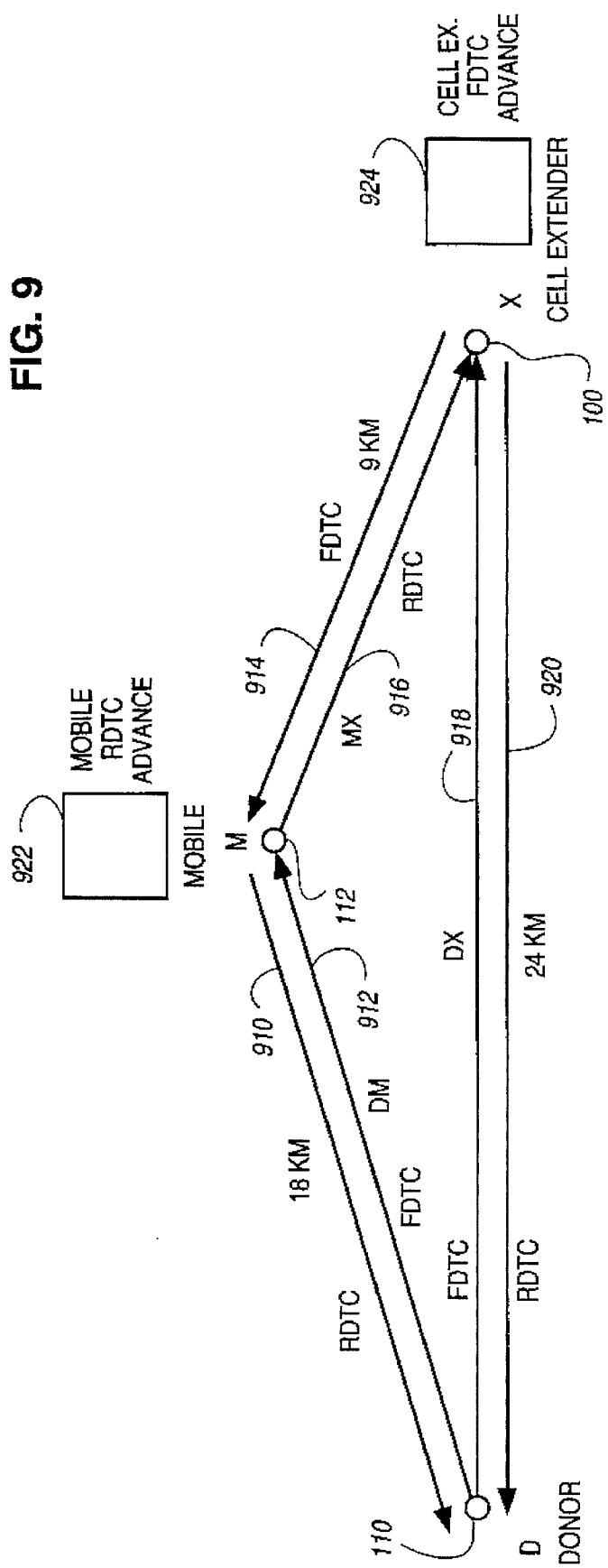
FIG. 9 is a diagram illustrating, in greater detail, the communications signal timing relationships between the base station, subscriber terminal, and the cell extender which must be taken into account when a subscriber terminal in direct communications with a base station is to begin using the cell extender as an intermediary, or vice versa.

FIG. 8 shows a portion of a cellular system served by a donor cell site 110 and a cell extender 100. For illustration, the cell extender 100 is shown as being located 24 km from the donor site 110. The cell extender 100 can capture a mobile (i.e., force a "hand-in" from the donor site to the cell extender), or return a mobile (i.e., force a "hand-out" from the cell extender) only when the mobile is located within a transfer zone 816. The hand-out transfer zone 816 is bounded by parabolic curves 812, 814. In the example of FIG. 8, the transfer zone 816 is nominally 12 km wide. The hand-in transfer zone is closer to the cell extender due to the capture ratio (at least 6 dB) required to enable the cell extender to override the donor FDTC that is being received by the mobile. For this example, the hand-in transfer zone is assumed to be 15 km from the donor cell, but the actual transfer zone position will depend, in part, on the respective effective radiated signals transmitted by the cell extender and the donor cell. If the mobile is within the transfer zone, the timing jump experienced by the donor site as a result of a hand-out or hand-in is less than or equal to ±2.0 symbols (the cell extender timing delay is adjusted to make this true). It is expected that all commercial cell site equipment will be capable of tolerating timing jumps of at least ±2.0 symbols.

Arc 818 has a radius of 9 km about the cell extender 100 and represents an arbitrarily defined hand-in boundary within which is considered the coverage area of the cell extender 100. Thus, a mobile located on the arc 818 is at the boundary of the cell extender coverage area. A mobile located on the arc 818 moving toward the cell extender 100 may be a candidate for a hand-in. Concentric arcs 820, 822, 824, 826 centered about the donor site 110 represent distances of 15, 18, 21, and 24 km from the donor site, respectively. As noted previously, the donor site controls a timing advance parameter of the mobile according to the round trip propagation delay experienced along the mobile-to-donor-site RF path. For a mobile located on arcs 820, 822, 824, and 826, the timing advance parameter will be set to 2.5, 3.0, 3.5, and 4.0 symbols, respectively. Each of the positions A, B, C, and D represent the intersection between the cell extender coverage area boundary and the distance arcs 820, 822, 824, and 826. For example, a mobile located at point B is 9 km from the cell extender, and 18 km from the donor site.

As noted previously, the scanning module 132 must time its "hand-in" message so that the message arrives aligned with the donor site FDTC data stream with an alignment error no greater than ¼ symbol. This would be relatively easy if either the exact location of the mobile, or the exact ranges of the mobile from the cell extender and the donor, were available while the mobile is communicating directly with the donor site. However, this information is not generally available. The mobile-to-donor-site and mobile-to-cell-extender propagation delays vary with the position of the mobile. In addition, the mobile's timing advance parameter, and therefore, the relative timing alignment between the FDTC received by the mobile and RDTC transmitted by the mobile, also varies with the mobile's position.

The scanning module 132 calculates a timing advance parameter which it uses to control the timing of its "hand-in" message with respect to the FDTC signal received from the donor site.

Although the exact position of the mobile cannot be determined, it can be shown that when the donor tightly controls the mobile advance timing, an appropriate timing advance parameter $T_{Advance}$ can be calculated using the propagation delay $T_{DX}$ between the donor site 110 and the cell extender 100 (which is known), and the observed skew or timing difference $\Delta T_{observed}$ between the RDTC received from the mobile and the FDTC received from the donor site according to the following formula:

$$T_{Advance} = 2T_{DX} - \Delta T_{observed}.$$

The effect of the scanning module's use of the timing advance parameter is best seen in FIGS. 9 and 10. FIG. 9 is a simplified map-like diagram which shows the propagation paths and associated delay contributions which occur when the mobile is in direct communications with the base station (i.e. engaged in a conversation), and when the cell extender attempts to capture the mobile. FIG. 10 is a timing diagram 930 which shows that when the scanning module uses a timing advance calculated as described above to control its "hand-in" message timing, the "hand-in" message arrives in proper alignment with the FDTC data stream from the donor cell.

The FDTC and RDTC signals are periodic signals with a consistent cycle time. The arrows of FIG. 10 represent an offset from the benchmark timing, with respect to a fixed point in the FDTC-RDTC timing cycle, such as the start of a frame, caused by a signal propagation path or an advance or delay contribution from the mobile or cell extender. The arrows do not represent elapsed time. The timing of the donor site FDTC, as determined by an observer proximate thereto, is used as a benchmark herein and is denoted by the arrow 932 of FIG. 10. To enhance clarity, the speed of signal propagation is approximated herein as 12 km per symbol (the actual value is 12.337 km per symbol). Also to enhance clarity, the mobile's nominal timing offset of 207 symbols between the received FDTC and the transmitted RDTC is ignored.

The mobile 112 is located at position B of FIG. 8, and is in direct communication with the cell site 110. The cell extender 110 is not aware of the mobile's exact position, nor its timing advance parameter. However, the mobile 112 is located 18 km from the donor site 110 and therefore experiences a one-way propagation delay along path 912 of 1.5 symbols. Accordingly, the cell site 110 has set the mobile's timing advance parameter 922 to 3 symbols (corresponding to the two-way propagation delay along paths 910 and 912). As best seen in section 934 of FIG. 10, the propagation delay 910d along path 910 is 1.5 symbols, and thus, the FDTC signal from the donor cell arrives at the mobile delayed by 1.5 symbols with respect to the benchmark time 932. This time is noted by arrow 942. Accordingly, in order for the scanning module's "hand-in" message to be properly aligned, it must also arrive at the mobile delayed 1.5 symbols with respect to the benchmark time.

The timing skew between the RDTC received from the mobile 110 and the FDTC received from the donor site 112 is shown in sections 934 and 936 of FIG. 10. The RDTC is transmitted by the mobile 3 symbols advanced, as controlled by the mobile timing advance parameter 922 set by the donor site, as shown by arrow 922d. The mobile 112 is located 9 km (0.75 symbols) from the cell extender. Thus, the RDTC transmitted by the mobile along path experiences a propagation delay 916d of 0.75 symbols, arriving at the cell extender 0.75 symbols advanced. The cell extender is located 24 km (2.0 symbols) from the donor cell 110. Therefore the FDTC from the donor cell experiences a propagation delay 918d of 2.0 symbols along path 918. Thus, the timing skew 940 between the RDTC received from the mobile 110 and the FDTC received from the donor site 112 is −2.75 symbols. The scanning module 132 measures the skew 940 and, using the formula given above, calculates that the timing advance parameter 924 should be 1.25 symbols.

Section 938 of FIG. 10 shows the timing of the "hand-in" message transmitted by the scanning module 132. The scanning module 132 bases its timing on the FDTC signal received from the donor site. The FDTC signal experiences a propagation delay 918d along path 918 of 2 symbols. The scanning module advances its timing according to the previously calculated timing advance parameter 924d of 1.25 symbols. Thus, the scanning module transmits its "hand-in" message 0.75 symbols delayed, with respect to the benchmark time. The "hand-in" message experiences a propagation delay 914d along path 914 of 0.75 symbols. Accordingly, the "hand-in" message arrives at the mobile 1.5 symbols delayed, as noted by arrow 944. By comparing arrows 942 and 944, it can be seen that the "hand-in" message from the scanning module should arrive exactly aligned with the donor site FDTC data stream.

In operation, however, the calculated advance may not be exactly correct. For example, the mobile time advance may not be correct (±½ symbol). If the mobile does not acknowledge a "hand-in" instruction within 200 ms, it is assumed that the message was incorrectly aligned. In that case, the scanning module 132 perturbs the timing advance parameter by ¼ symbol and retries. The number of such retries is preferably selectable.

If the donor cell is loosely controlling the mobile timing advance (±2 symbols), one of two other methods may give better estimates of the correct cell extender timing advance. If Mobile Assisted Hand Off (MAHO) messages report the signal levels received by the mobile from the donor and the cell extender, the signal levels can be used to estimate the propagation delays from the mobile to the donor and to the cell extender. A second method is to assume that the mobile advance will be a predetermined constant when the mobile is within the transfer zone. In this case, the measured signal level of the mobile at the cell extender and the apparent advance of the mobile's timing advance can give an estimate of the correct cell extender timing advance.

Figure 11A:
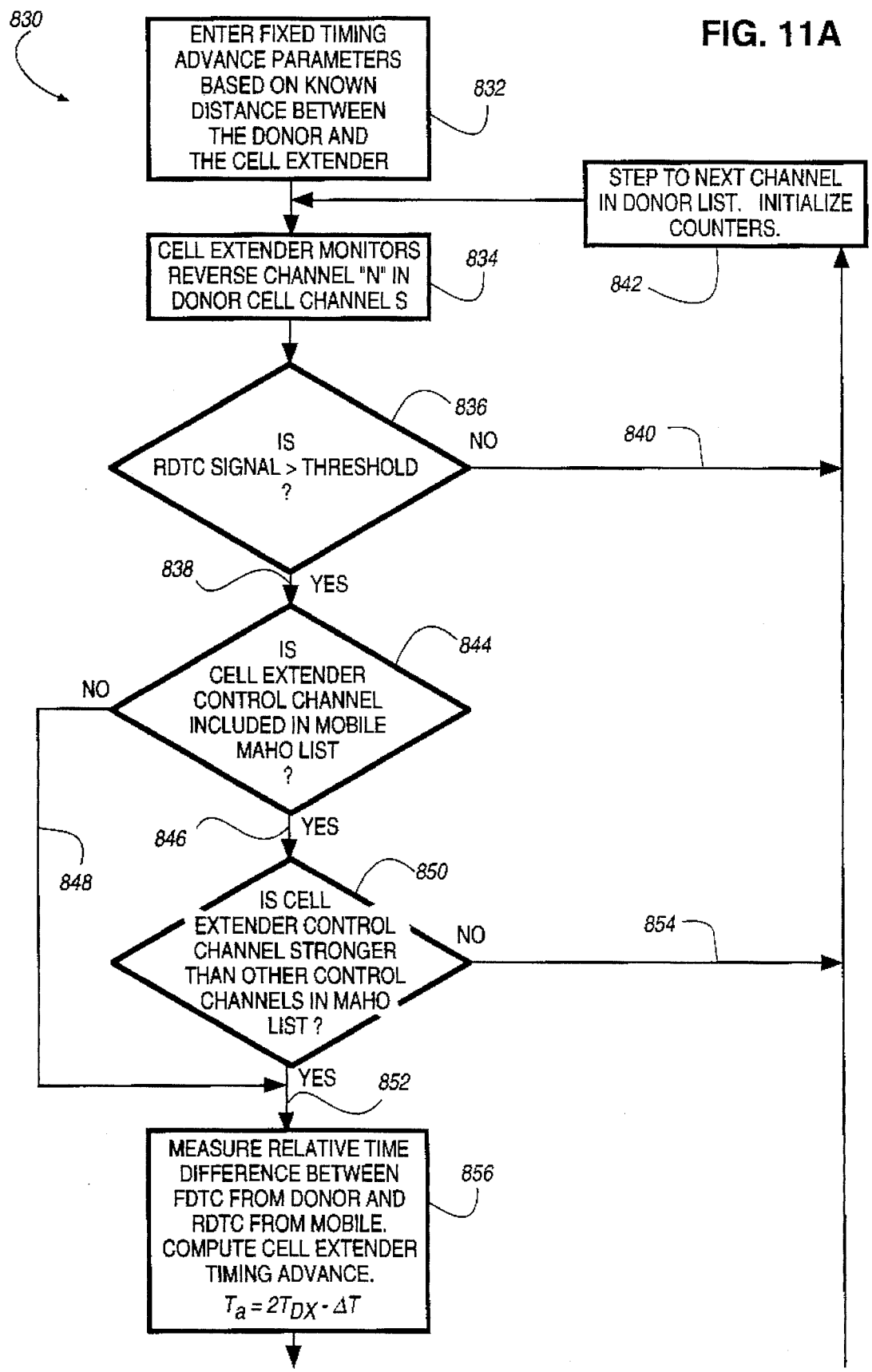
FIG. 11 is a flow diagram illustrating a call processing method 830 for instructing, when appropriate, a subscriber terminal which is in direct communications with a base station to begin using the inventive cell extender 100 as an intermediary, and for determining a second timing advance parameter to be used by the inventive cell extender 100 of FIG. 1 to provide proper synchronism in communications between the cell extender and the subscriber terminal.
Figure 11B:
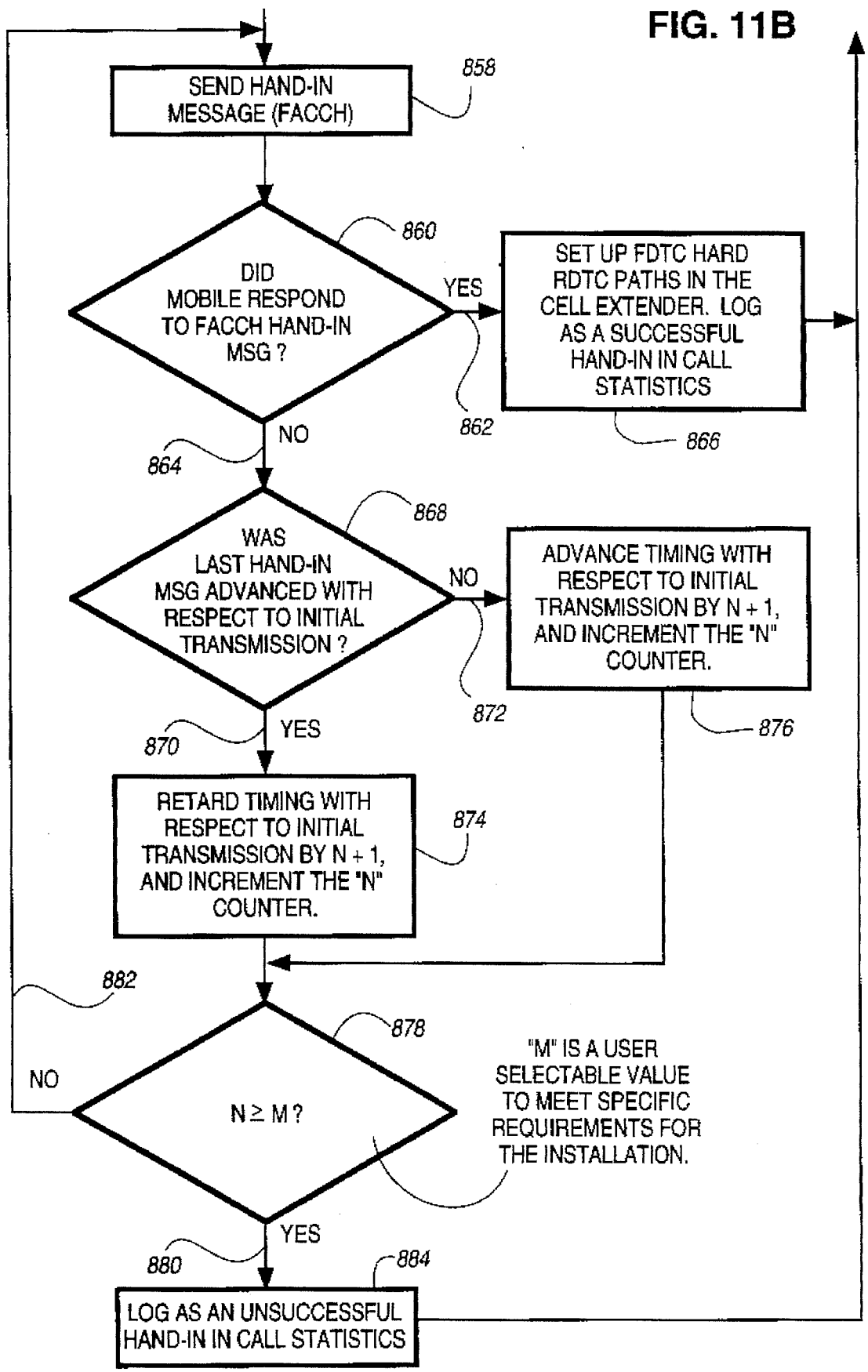

FIG. 11 is a flow diagram illustrating a call processing method 830 for instructing, when appropriate, a subscriber terminal which is in direct communications with a base station to begin using the inventive cell extender 100 as an intermediary, and for determining a second timing advance parameter to be used by the inventive cell extender 100 of FIG. 1 to provide proper synchronism in communications between the cell extender and the subscriber terminal.

As best seen in FIG. 11, method 830 begins at step 832, in which certain parameters dependent on the location of the cell extender are initialized. In step 832, a fixed timing advance component (see items 922 [FIG. 9] and 922d [FIG. 10]) calculated from the known distance between the cell extender and the donor site, is entered into the cell extender.

The process by which the cell extender intervenes in an existing direct conversation between a mobile and a donor cell is called a "hand-in" Preferably, the cell extender attempts to hand-in only conversations in which the communications quality will be improved by using the cell extender as an intermediary. Accordingly, in step 834, the cell extender begins a process in which it evaluates each of the reverse digital traffic channels (RDTC) in the channel set of the donor cell to determine whether the channel is in use, and if so, whether the cell extender can improve communications by executing a hand-in. In digital communications of the type contemplated here, communications quality is typically measured by evaluating the number of errors in a received signal. However, since the error rate is closely (and inversely) related to signal strength, signal strength measurements are usually good predictors of communications quality. The cell extender maintains a list of channels allocated to the donor cell, and when this process begins, the cell extender initializes a counter indicating which channel among those in the list is currently being evaluated. The cell extender monitors the "current" channel.

In step 836, the cell extender measures the strength of the current channel's RDTC signal to determine whether the signal exceeds a predefined threshold, indicating that the channel is a potential candidate for intervention by the cell extender. The threshold is typically selected such that when an RDTC signal strength exceeds the threshold, the associated mobile is located in a position in which communications quality may be improved by communicating through the cell extender (compared to communications directly with the cell site). Thus, when the RDTC signal strength exceeds the threshold, the associated mobile is considered to be within the coverage area of the cell extender, and the cell extender takes branch 838 to step 844 for further consideration of whether to intervene. If the RDTC signal strength does not exceed the threshold, branch 840 is taken and the process continues with step 842, in which the "current" channel counter is advanced to the next donor cell channel.

In step 844, the cell extender examines a portion of the RDTC data stream from the mobile to determine whether the cell extender control channel is included in the mobile's Mobile Assisted Hand Off/MAHO) list. If the control channel is in the mobile MAHO list, then the cell extender can use the mobile's own signal strength measurements to determine whether the mobile is actually receiving the cell extender better than either the donor cell or other potential handoff candidates. In that case, branch 846 is taken and the process continues with step 850. In step 850, the cell extender examines the MAHO information received from the mobile to determine whether the cell extender control channel is stronger than any other control channel, as measured by the mobile. If not, the cell extender refrains from attempting a hand-in. Branch 854 is taken, and the process returns to step 842 in which the "current" channel counter is advanced to the next donor cell channel. If the cell extender control channel is stronger than any other control channel, the cell extender will proceed through branch 852 to step 856 to begin the handoff attempt. If, in step 844, the mobile does not provide MAHO information for the cell extender control channel, then the cell extender will proceed through branch 848 to step 856.

In step 856, the cell extender measures the relative time difference between the FDTC signal received from the donor cell and the RDTC signal received from the mobile. The cell extender calculates the cell extender timing advance using this information and a fixed timing advance component initialized in step 832 according to the formula:

$$T_{Advance} = 2T_{DX} - \Delta T_{observed}.$$

In step 858, the cell extender formats and sends a hand-in message (using the Fast Associated Control CHannel [FACCH]), instructing the mobile to use one of the cell extender's channels. The timing of the message is advanced by the timing advance parameter calculated in step 856. In step 860, the cell extender determines whether the mobile responded properly to the hand-in message. If so, the cell extender proceeds through branch 862 to step 866. In step 866, the cell extender sets up the forward and reverse digital traffic channels FDTC and RDTC for use in repeating and translating the conversation. The cell extender also logs the hand-in as successful in certain call statistics records which it maintains. The cell extender proceeds to step 842 in which the "current" channel counter is advanced to the next donor cell channel.

If the mobile fails to properly respond to the hand-in message, the timing of the hand-in message may have been incorrect. Accordingly, the cell extender makes several additional hand-in attempts, perturbing the calculated timing advance in 0.25 symbol steps, in an effort to find the correct timing alignment through trial and error. For this process, the cell extender maintains a counter, referred to herein as "N", which controls the amount by which the timing of each subsequent hand-in attempt deviates from the timing calculated for the initial attempt (see step 856). The value in N refers to a number of 0.25 symbol steps. In addition, the cell extender maintains a parameter M, which it consults to determine the maximum deviation (with respect to the timing of the initial attempt) which it may use in its search for the correct timing alignment. The parameter M is selectable by the operator of the cell extender to meet specific requirements for the installation.

When this process begins, the cell extender sets N to zero. If the initial hand-in attempt fails, the cell extender resends the hand-in message with timing advanced by N+1 0.25 symbol steps with respect to the initial timing. If that hand-in attempt fails, the cell extender resends the hand-in message with timing retarded by N+1 0.25 symbol steps with respect to the initial timing. If that hand-in attempt fails, the cell extender increments N. This process continues until the mobile properly responds to the hand-in message, or until N equals or exceeds M. Thus, M serves to limit the maximum amount of timing adjustment (with respect to the initial timing) for which attempts to resend the hand-in message will be made, and M also effectively limits the total number of hand-in message retries which will be attempted in a particular hand-in episode.

This process is best seen in FIG. 11. As noted above, if a mobile fails to properly respond to a hand-in message, the cell extender executes step 868, in which it determines whether the most recent hand-in message was advanced with respect to the initial transmission. If the most recent hand-in message was not advanced, then the cell extender proceeds through branch 872 to step 876. The timing for the next hand-in message is advanced by N+1 (with respect to the timing of the initial message), and N is incremented. If the most recent hand-in message was advanced, then the cell extender proceeds through branch 870 to step 874. The timing for the next hand-in message is retarded by N+1 (with respect to the timing of the initial message), and N is incremented. In either case, the cell extender continues with step 878, in which N is compared to M to determine whether the limit for hand-in message timing adjustment attempts has been reached. If N is less than M (i.e., the limit has not been reached), then the cell extender proceeds through branch 882 to step 858 (in which the hand-in message is resent according to the adjusted timing). If N is greater than or equal to M, then the limit has been reached. The cell extender proceeds through branch 880 to step 884, in which it logs the hand-in as unsuccessful, and then to step 842 in which the "current" channel counter is advanced to the next donor cell channel.

Figure 2:
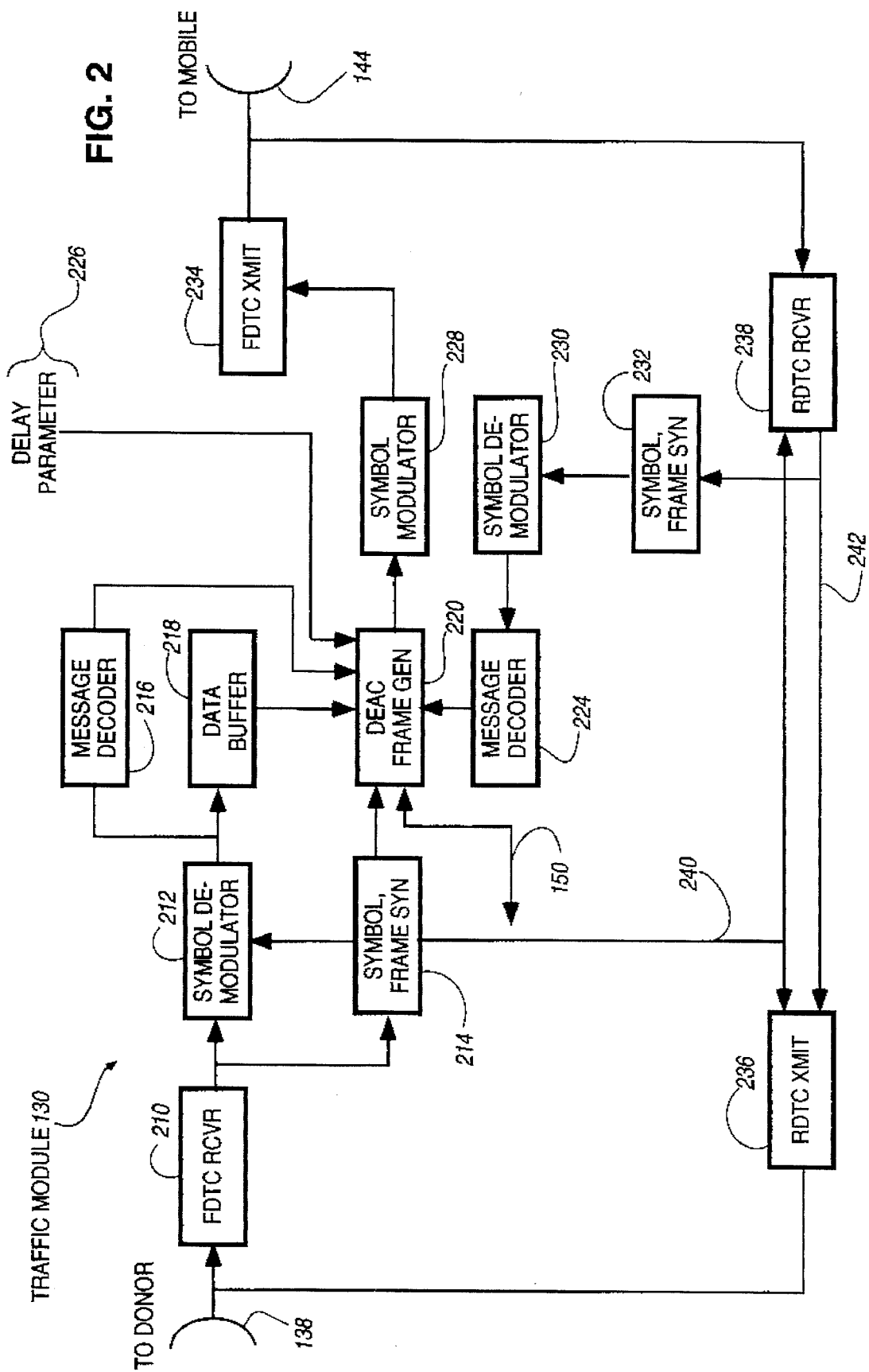
FIG. 2 is a functional block diagram of a traffic module component 130 of the cell extender 100 of FIG. 1.

FIG. 2 is a functional block diagram of a traffic module 130 for use in the cell extender 100 of the present invention. At least one antenna 138 is provided for communications between the traffic module 130 and the donor site 110. At least one antenna 144 is provided for communications between the traffic module 130 and mobiles (not shown) within the coverage area of the cell extender 100. As noted previously, a particular antenna may be used for several purposes, and the traffic module may share one or more antennas with other modules.

The traffic module 130 has a receiver 238 for receiving a Reverse Data Traffic Channel from a mobile on one of the cell extender's allocated channels, and a transmitter 236 for repeating the RDTC on a donor site channel previously assigned to that mobile. The reverse channel preserves the multipath signals received at the cell extender and allows the donor cell delay-spread equalizer to be effective. The receiver 238 amplifies RDTC signals from the mobile. Synchronization means 232 recovers synchronization and timing information from the RDTC signal. The traffic module 130 also includes a symbol demodulator 230 for recovering the data from the RDTC signal. Although the recovered data is not used to retransmit the RDTC signal, it may carry information useful to the cell extender. For example, the mobile may report important signal strength measurements via Mobile Assisted Hand Off (MAHO) messages carried on the RDTC. An inter-module data communications interchange facility 150 is provided to allow the traffic module 130 to exchange this, and any other required information, with other modules.

The traffic module 130 includes a receiver 210 connected to the antenna 138 for receiving a Forward Digital Traffic Channel FDTC from the donor site. The receiver 210 amplifies signals from the donor cell assigned traffic channel. Synchronization means 214 recovers synchronization and timing information from the FDTC signal. The synchronization means 214 produces, inter alia, an AGC gating signal 240 used to enable the Reverse Data Traffic Channel output of the traffic module 130 only during time slots assigned to the mobiles currently being repeated. AGC gate signal 240 may be supplied to one or both of the RDTC receiver 238 and RDTC transmitter 236 as required to inhibit transmission during the unassigned time slots.

The traffic module 130 also includes a symbol demodulator 212 for recovering the data from the FDTC signal. A data buffer 218 is provided for temporary storage of FDTC information before retransmission. According to one aspect of the present invention, buffering the received FDTC information permits the traffic module to delay retransmission of FDTC data in order to provide a desired relationship between the received and retransmitted FDTC signals. The delay, which is controlled according to delay parameter 226, may have the apparent effect of "advancing" the timing of the delayed signal. This function is used to compensate for propagation and other delays introduced by the cell extender, and enables the cell extender to operate in a substantially transparent manner from the view point of the mobiles and donor site it serves.

An FDTC message decoder 216 decodes portions of the FDTC data stream. A RDTC message decoder 224 similarly decodes portions of the RDTC data stream. A framing generator 220 receives the FDTC data stream information from message decoder 216 and data buffer 218 and constructs a new FDTC data stream for transmission to the mobile. The framing generator 220 may generate and insert certain locally generated messages for controlling the mobile. For example, the framing generator 220 may generate a "hand-out" message instructing the mobile to return to the channel originally assigned by the donor site. In addition, the framing generator 220 may generate a message instructing the mobile to adjust its transmitter power, in order to maintain the mobile's received signal strength within a desired window. Other messages to the mobile could also be generated as are required. The new data stream is modulated by symbol modulator 228 as specified by EIA/TIA IS-54-B. The resulting modulated signal is amplified and transmitted to the mobile by FDTC transmitter 234.

Figure 3:
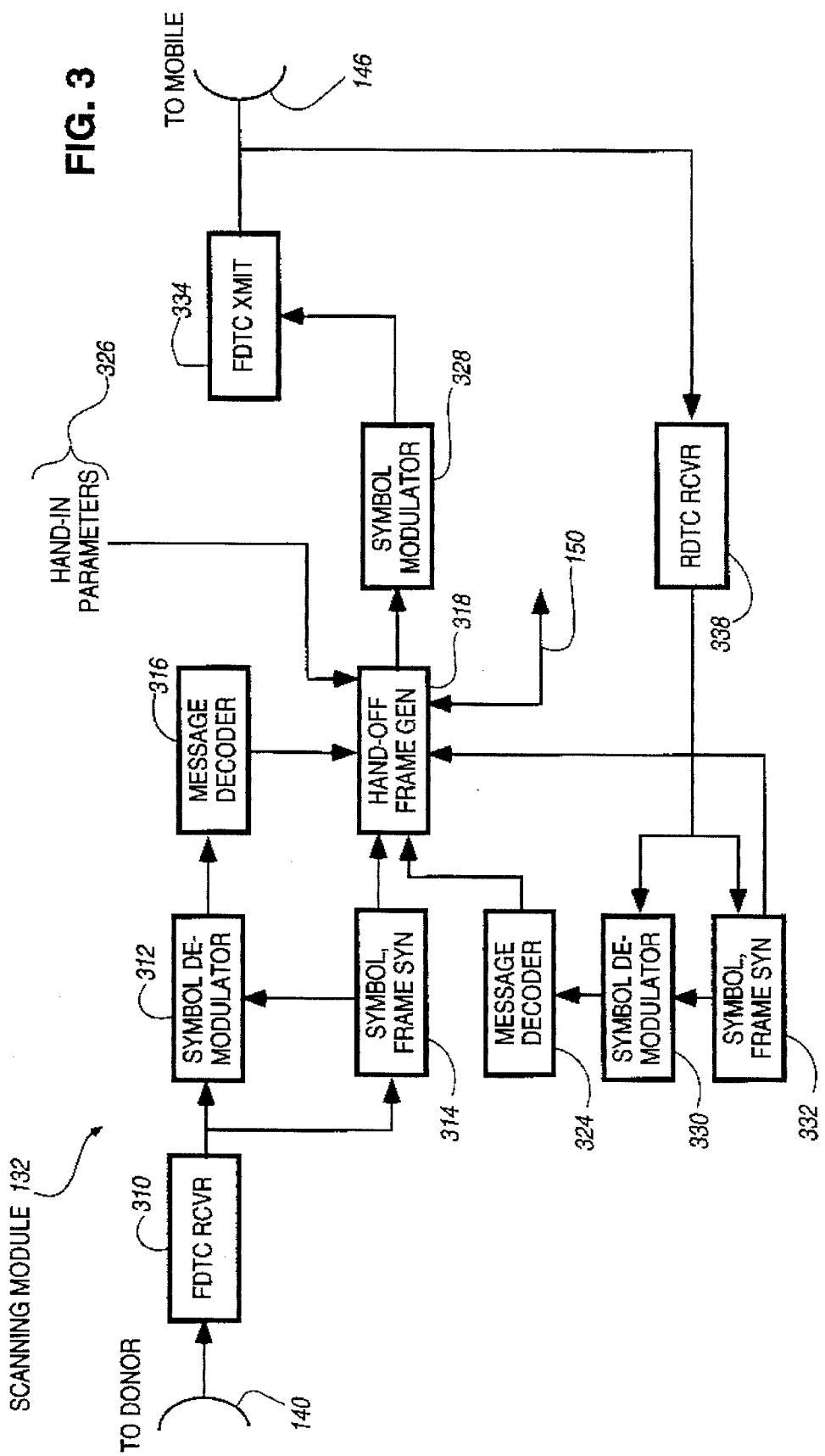
FIG. 3 is a functional block diagram of a scanning module component 132 of the cell extender 100 of FIG. 1.

FIG. 3 is a functional block diagram of a scanning module 132 for use in the cell extender 100 of the present invention. The scanning module 132 is substantially similar to the traffic module 130, but need not provide the RDTC transmitter 236 and the FDTC data buffer 218 of the traffic module.

At least one antenna 138 is provided for communications between the scanning module 132 and the donor site 110. At least one antenna 146 is provided for communications between the scanning module 132 and certain mobiles (not shown) in the coverage area of the donor site or the cell extender. As noted previously, a particular antenna may be used for several purposes, and the traffic module may share one or more antennas with other modules.

The scanning module 132 has a receiver 338 for receiving a Reverse Data Traffic Channel from a mobile. The receiver 338 amplifies RDTC signals from the mobile. Synchronization means 332 recovers synchronization and timing information from the RDTC signal. The scanning module 132 also includes a symbol demodulator 330 for recovering the data from the RDTC signal. Although the recovered data is not used to retransmit the RDTC signal, it may carry information useful to the cell extender. For example, the scanning module 132 uses the mobile timing and synchronization information supplied via the RDTC. The scanning module also measures the mobile's RDTC signal strength. In addition, the mobile may report important signal strength measurements via Mobile Assisted Hand Off (MAHO) messages carried on the RDTC. When determining whether a "hand-in" is appropriate, the scanning module determines whether the mobile's MAHO measurements include measurements of the cell extender forward control channel (FOCC). If so, the cell extender requests a "hand-in" only if the cell extender signal strength exceed that of the donor cell. An inter-module data communications interchange facility 150 is provided to allow the scanning module 132 to exchange this, and any other required information, with other modules.

The scanning module 132 includes a receiver 310 connected to the antenna 140 for receiving a Forward Digital Traffic Channel FDTC from the donor site. The receiver 310 amplifies signals from the donor cell assigned traffic channel. Synchronization means 314 recovers synchronization and timing information from the FDTC signal.

The scanning module 132 also includes a symbol demodulator 312 for recovering the data from the FDTC signal. An FDTC message decoder 316 decodes portions of the FDTC data stream. A RDTC message decoder 324 similarly decodes portions of the RDTC data stream. A hand-off frame generator 318 receives the FDTC data stream information from message decoders 316 and 324 and constructs properly formatted and time aligned handoff messages for transmission to the mobile over the FDTC. The scanning module 132 typically calculates the time alignment of the hand-off message based on the apparent time alignment of the mobile RDTC transmissions. If MAHO signal level measurements are being received from the mobile, the scanning module 132 may use these measurements to calculate the time alignment. In some cases, a combination of the RDTC signal level and the apparent time alignment is used. Unless the signal strength of the mobile exceeds a programmed threshold, or the MAHO messages show that the cell extender signal exceeds the donor signal at the mobile, no hand-in attempts are made.

The mobile generates hand-off acknowledgment messages which are transmitted via FACCH messages over the RDTC. The donor site must ignore such messages. The inserted FDTC data stream containing formatted handoff messages produced by hand-off frame generator 318 is modulated by symbol modulator 328 as specified by EIA/TIA 15-54-B. The resulting modulated signal is amplified and transmitted to the mobile by FDTC transmitter 334.

Figure 4:
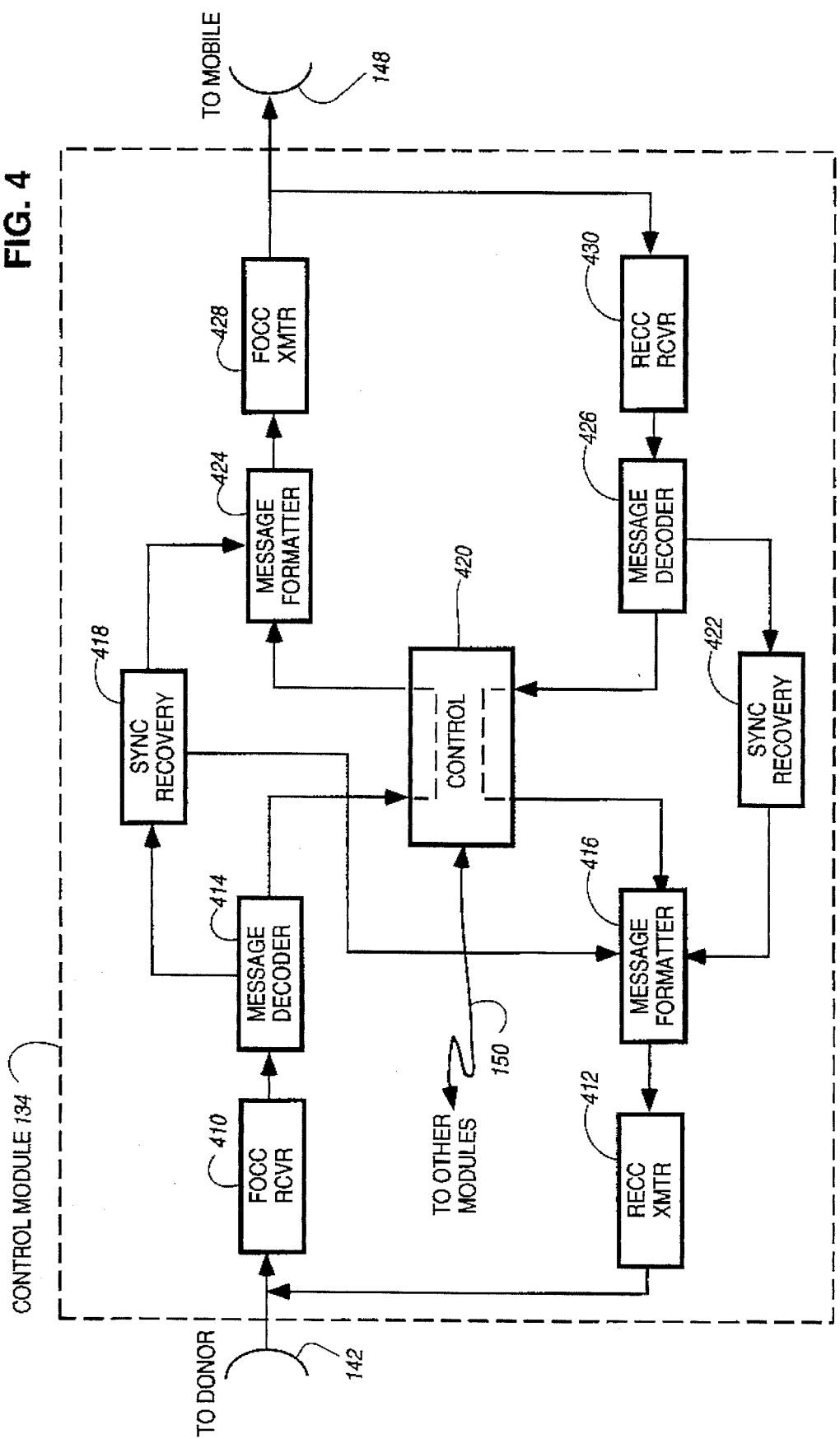
FIG. 4 is a functional block diagram of a control module component 134 of the cell extender 100 of FIG. 1.

FIG. 4 is a functional block diagram of a control module 134 for use in the cell extender 100 of the present invention. The control module 134 is used to translate and repeat the Forward Control Channel (FOCC) and Reverse Control Channel (RECC) of the donor site on a control channel assigned to the cell extender. Both analog-only and digital-capable mobiles may use the control channels served by the control module.

At least one antenna 142 is provided for communications between the control module 134 and the donor site 110. At least one antenna 148 is provided for communications between the control module 134 and certain mobiles (not shown) in the coverage area of the donor site or the cell extender. As noted previously, a particular antenna may be used for several purposes, and the traffic module may share one or more antennas with other modules.

The control module 134 has a receiver 410 for receiving the FOCC from the donor site, a message decoder 414 for decoding the contents of the FOCC, synchronization means 418 for recovering timing and synchronization information from the FOCC, a message formatter 424 for reformatting a new FOCC signal for use by mobiles, and an FOCC transmitter 428 for retransmitting the new FOCC signal.

The control module 134 has a second receiver 430 for receiving the RECC from mobiles, a message decoder 426 for decoding the contents of the RECC, synchronization means 422 for recovering timing and synchronization information from the RECC, a message formatter 416 for reformatting a new RECC signal for reception by the donor site, and an RECC transmitter 412 for retransmitting the new RECC signal to the donor site.

The control module 134 includes control means 420 for managing the operation of the module. An inter-module data communications interchange facility 150 is provided to allow the control module 134 to exchange information with other modules as needed. In operation, the control module 134 continuously translates and repeats the donor site FOCC. It monitors the RECC for transmissions from mobiles that wish to originate a call or to answer a page. If the donor site sends a channel assignment message addressed to the mobile, the control module 134 intercepts the message on the FOCC, and replaces the message with one assigning a channel allocated to the cell extender if one is available.

The above-described modules 130, 132, and 134, shown in the block diagrams of FIG. 2–4, could be implemented using any appropriate technologies as will be apparent to those skilled in the art. In one exemplary embodiment, the modules may be implemented using one or more software-controlled digital signal processors, along with suitable additional support components which may be required. However, other suitable technologies could also be used.

The above-described embodiments of the invention are merely examples of ways in which the invention may be carried out. Other ways may also be possible, and are within the scope of the following claims defining the invention.

What is claimed is:

1. For use with digital cellular telephone systems having at least one cell site and at least one subscriber terminal, said subscriber terminal adapted to receive a first forward digital traffic channel from said cell site and to transmit a first reverse digital traffic channel to said cell site, said subscriber terminal being responsive to the time at which a predefined element of said first forward digital traffic channel arrives to establish the timing of its transmission of said first reverse digital traffic channel; a cell extender comprising:

means for fixing a selected delay to which radio-frequency signals between said cell site and said cell extender are subject;

first receiving means for receiving a first forward digital traffic channel signal from said cell site;

first transmitting means for transmitting a second forward digital traffic channel signal to said subscriber terminal;

second receiving means for receiving a first reverse digital traffic channel signal from said subscriber terminal;

second transmitting means responsive to said second receiving means for transmitting a second reverse digital traffic channel signal to said cell site;

and timing means responsive to said first receiving means and said means for fixing a selected delay for controlling the time at which said second forward digital traffic channel signal is transmitted to said subscriber terminal by said cell extender;

whereby a predefined element of said second reverse digital traffic channel signal arrives at said cell site at a predetermined shifted time.

2. The cell extender of claim 1 further comprising means for storing at least a portion of said first forward digital traffic channel signal received from said cell site.

3. The cell extender of claim 2 wherein said first transmitting means further comprises means for formatting said second forward digital traffic channel signal;

said formatting means being responsive to said storage means to include at least a part of said stored portion of said first forward digital traffic channel signal in said second forward digital traffic channel signal.

4. The cell extender of claim 1 wherein:

each of said digital traffic channels is formed as a periodically adjacent series of information frames;

each of said information frames is formed from a predefined number of periodically adjacent information slots having a predefined slot period; and information corresponding to said subscriber terminal occupies at least one slot in each of said information frames of said received first forward digital traffic channel signal; and said first transmitting means is responsive to said timing means for transmitting said information on said second forward digital traffic channel signal after a delay at least as long as said predefined slot period.

5. For use with digital cellular telephone systems having at least one cell site and at least one subscriber terminal, said subscriber terminal adapted to receive a first forward digital traffic channel from said cell site and to transmit a first reverse digital traffic channel to said cell site, said subscriber terminal being responsive to the time at which a predefined element of said first forward digital traffic channel arrives to establish the timing of its transmission of said first reverse digital traffic channel; a cell extender comprising:

- means for fixing a selected delay substantially corresponding to a radio-frequency propagation delay to which radio-frequency signals between said cell site and said cell extender are subject;
- first receiving means for receiving a first forward digital traffic channel signal from said cell site;
- first transmitting means for transmitting a second forward digital traffic channel signal to said subscriber terminal;
- second receiving means for receiving a first reverse digital traffic channel signal from said subscriber terminal;
- second transmitting means responsive to said second receiving means for transmitting a second reverse digital traffic channel signal to said cell site;
- said first forward digital traffic channel signal and said second reverse digital traffic channel signal each experiencing a propagation delay between said cell extender and said cell site;
- said second forward digital traffic channel having a timing alignment offset with respect to said first forward digital traffic channel;
- and propagation delay compensation means for adjusting said timing alignment offset such that the effects of said propagation delay are minimized.

6. For use with digital cellular telephone systems having at least one cell site and at least one subscriber terminal, said subscriber terminal adapted to communicate with said cell site using digital messages using at least one traffic channel, said subscriber terminal receiving from said cell site an information signal having a predefined timing alignment;

a cell extender comprising:

- receiver means for scanning a plurality of traffic channels assigned for use by said cell site;
- activity detecting means for determining whether each of said traffic channels is in use to provide communications between said cell site and said subscriber terminal;
- coverage detecting means responsive to said activity detecting means for determining, for each active traffic channel, whether the subscriber terminal using said traffic channel is within a predefined coverage region for said cell extender;
- means responsive to said coverage detecting means for generating and transmitting a digital message to instruct said subscriber terminal to cease operating on said active traffic channel and to begin operating on a different traffic channel assigned for use by said cell extender;
- and timing alignment means for controlling the time at which said digital message is transmitted to said subscriber terminal such that said message is actually received by said subscriber terminal with a timing alignment substantially identical to that of said cell site information signal.

7. The cell extender of claim 6 further comprising means for measuring the strength of a signal received from said subscriber terminal and wherein said coverage detecting means is responsive to said measuring means.

8. The cell extender of claim 6 further comprising means for determining approximately the distance between said subscriber terminal and said cell extender; and wherein said coverage detecting means is responsive to said distance determining means.

9. The cell extender of claim 6 further comprising means for receiving information transmitted by said subscriber terminal relating to a measurement of the strength of a signal received by said subscriber terminal from said cell extender; and wherein said coverage detecting means is responsive to said information.

10. The cell extender of claim 6 further comprising means for receiving information transmitted by said subscriber terminal relating to a measurement of the strength of a signal received by said subscriber terminal from said cell site; and wherein said coverage detecting means is responsive to said information.

11. The cell extender of claim 6 further comprising means for measuring the strength of a signal received from said subscriber terminal and wherein said timing alignment means is responsive to said measuring means.

12. The cell extender of claim 6 further comprising means for determining approximately the distance between said subscriber terminal and said cell extender; and wherein said timing alignment means is responsive to said distance determining means.

13. The cell extender of claim 6 further comprising means for receiving information transmitted by said subscriber terminal relating to a measurement of the strength of a signal received by said subscriber terminal from said cell extender; and wherein said timing alignment means is responsive to said information.

14. The cell extender of claim 6 further comprising means for receiving information transmitted by said subscriber terminal relating to a measurement of the strength of a signal received by said subscriber terminal from said cell site; and wherein said timing alignment means is responsive to said information.

15. The cell extender of claim 14 further comprising means for comparing the relative timing synchronization between a signal received from said base site and a signal received from said subscriber terminal; and wherein said timing alignment means is responsive to said information.

16. A method of handing off a mobile radio telephone unit communicating on a donor site channel and under the control of and in direct communication with a donor site, said mobile unit receiving from said donor site an information signal having a predefined timing alignment, to a cell extender so that the mobile unit will communicate on a cell extender channel and will be under the control of and in direct communication with a cell extender, said mobile being responsive to messages from said cell extender exclusively during predefined time intervals within cyclically occurring time frames, comprising the steps of:

- determining whether the mobile unit is a candidate for hand-off to, and control by, a cell extender by (1) measuring the strength of a mobile unit signal between the mobile unit and the donor site, and (2) when available, also examining signal strength measurements provided by the mobile unit for the donor site and for the cell extender;
- generating a hand-off message instructing the mobile unit to use a cell extender channel; and
- in response to the determining step, sending said hand-off message to said mobile unit from said cell extender, the timing of transmission of said message being arranged such that said message arrives at said mobile unit within one of said predefined time intervals, said message being received by said mobile unit with a timing alignment substantially identical to that of said donor site information signal.

17. The method of claim 16 wherein the message sending step further comprises the step of controlling the timing of said transmission of said message such that the beginning of said message arrives at said mobile unit aligned within one-quarter symbol of the beginning of said one predefined time interval.

18. For use in a cellular telephone system having at least one donor cell, at least one subscriber terminal, and at least one additional device; said subscriber terminal being in direct communication with a donor cell over a radio channel assigned to said donor cell; said subscriber terminal being under control of said donor cell; said subscriber terminal receiving from said donor cell an information signal having a predefined timing alignment; a method for instructing said subscriber terminal to begin communications over a different radio channel comprising the steps of:

determining whether the subscriber terminal is a candidate for using said different radio channel;

generating a message instructing the subscriber terminal to use said different radio channel; and transmitting said message from said additional device to said subscriber terminal at a selected time such that said message is received by said subscriber terminal with a timing alignment substantially identical to that of said donor cell information signal.

19. The method of claim 18, wherein said determining step further comprises the steps of:

(1) measuring the strength of a signal transmitted by said subscriber terminal; and (2) comparing measurements by said subscriber terminal of a signal transmitted by said donor cell and a signal transmitted by said additional device, when such measurements are available.

20. The method of claim 19, wherein said determining step further comprises the step of:

determining that said subscriber terminal is a candidate for using said different radio channel if the measured strength of the signal transmitted by the subscriber terminal exceeds a predetermined threshold.

21. The method of claim 19, wherein said determining step further comprises the step of:

determining that said subscriber terminal is a candidate for using said different radio channel if the measurements by said subscriber terminal indicate that the signal transmitted by said additional device is stronger than the signal transmitted by said donor cell.

22. The method of claim 18 wherein said transmitting step further comprises the step of:

comparing the timing of a signal received from said subscriber terminal with the timing of a signal received from said donor cell.

23. The method of claim 18 wherein said transmitting step further comprises the steps of:

measuring a difference in timing between a signal received from said subscriber terminal with the timing of a signal received from said donor cell; and adjusting the time at which said signal is transmitted responsive to said measured timing difference.

24. The method of claim 18 wherein said transmitting step further comprises the steps of:

measuring a difference in timing between a signal received from said subscriber terminal with the timing of a signal received from said donor cell;

obtaining a timing parameter responsive to a known radio-frequency propagation delay between said donor cell and said additional device; and adjusting the time at which said signal is transmitted responsive to said measured timing difference and said timing parameter.

25. For use in a radio system having at least one control station, at least one user station, and at least one auxiliary station; said user station being in direct communication with said control station over a radio channel assigned to said control station; said user station being under the control of said control station; said user station receiving from said control station an information signal having a predefined timing alignment; a method for instructing said user station to begin communications over a different radio channel comprising the steps of:

determining whether the user station is a candidate for using said different radio channel;

generating a message instructing the user station to use said different radio channel; and transmitting said message from said auxiliary station to said user station at a selected time such that said message is received by said user station with a timing alignment substantially identical to that of said control station information signal.

26. The method of claim 25, wherein said determining step further comprises the steps of:

(1) measuring the strength of a signal transmitted by said user station; and (2) comparing measurements by said user station of a signal transmitted by said control station and a signal transmitted by said auxiliary station, when such measurements are available.

27. The method of claim 26, wherein said determining step further comprises the step of:

determining that said user station is a candidate for using said different radio channel if the measured strength of the signal transmitted by the user station exceeds a predetermined threshold.

28. The method of claim 26, wherein said determining step further comprises the step of:

determining that said user station is a candidate for using said different radio channel if the measurements by said user station indicate that the signal transmitted by said auxiliary station is stronger then the signal transmitted by said control station.

29. The method of claim 25 wherein said transmitting step further comprises the step of:

comparing the timing of a signal received from said user station with the timing of a signal received from said control station.

30. The method of claim 25 wherein said transmitting step further comprises the steps of:

measuring a difference in timing between a signal received from said user station with the timing of a signal received from said control station; and adjusting the time at which said signal is transmitted responsive to said measured timing difference.

31. The method of claim 25 wherein said transmitting step further comprises the steps of:

measuring a difference in timing between a signal received from said user station with the timing of a signal received from said control station;

obtaining a timing parameter responsive to a known radio-frequency propagation delay between said control station and said auxiliary station; and adjusting the time at which said signal is transmitted responsive to said measured timing difference and said timing parameter.

32. For use by an auxiliary station in a radio system having at least one control station and at least one user station; said user station being in direct communication with said control station over a radio channel assigned to said control station; said user station being under control of said control station; said user station receiving from said control station an information signal; said user station being receptive to control information included in said information signal at a predefined time; a method for capturing control of said user station comprising the steps of:

determining whether the user station is a candidate for capture;

said auxiliary station generating a message instructing the user station to begin receiving control information from said auxiliary station; and said auxiliary station transmitting said message on said radio channel to said user station at a selected time such that said message is received by said user station at said predefined time and with adequate signal strength to substantially replace said control station information signal.

33. In a method for operating a digital cellular telephone system having at least one cell site, at least one cell extender, and at least one subscriber terminal in which said subscriber terminal is adapted to receive a first forward digital traffic channel from said cell site and to transmit a first reverse digital traffic channel to said cell site, said subscriber terminal being responsive to the time at which a predefined element of said first forward digital traffic channel arrives to establish the timing of its transmission of said first reverse digital traffic channel; the steps comprising:

fixing a selected delay to which radio-frequency signals between said cell site and said cell extender are subject;

receiving a first forward digital traffic channel signal from said cell site;

transmitting a second forward digital traffic channel signal to said subscriber terminal;

receiving a first reverse digital traffic channel signal from said subscriber terminal;

in response to receipt of said first reverse digital traffic channel signal, transmitting a second reverse digital traffic channel signal to said cell site;

controlling the time an which said second forward digital traffic channel signal is transmitted to said subscriber terminal by said cell extender in response to said receipt of the first forward digital traffic channel signal from the cell site and to said selected delay, whereby a predefined element of said second reverse digital traffic channel signal arrives at said cell site at a predetermined shifted time.

34. In a method for operating a digital cellular telephone system having at least one cell site, at least one cell extender, and at least one subscriber terminal in which said subscriber terminal is adapted to receive a first forward digital traffic channel from said cell site and to transmit a first reverse digital traffic channel to said cell site, and in which said subscriber terminal is responsive to the time at which a predefined element of said first forward digital traffic channel arrives to establish the timing of its transmission of said first reverse digital traffic channel; comprising the steps of:

fixing a selected delay substantially corresponding to a radio-frequency propagation delay to which radiofrequency signals between said cell site and said cell extender are subject;

receiving a first forward digital traffic channel signal from said cell site;

transmitting a second forward digital traffic channel signal to said subscriber terminal, said transmission subject to a timing alignment offset with respect to said first forward digital traffic channel;

receiving a first reverse digital traffic channel signal from said subscriber terminal;

transmitting a second reverse digital traffic channel signal to said cell site responsive to receipt of said first reverse digital traffic channel signal; and adjusting said timing alignment offset such that the effects of propagation delay experienced by said first forward digital traffic channel signal and said second reverse digital traffic channel signal during transit between said cell extender and said cell site are minimized.

35. In a method for controlling a digital cellular telephone system having at least one cell site, at least one cell extender, and at least one subscriber terminal in which said subscriber terminal is adapted to communicate with said cell site using digital messages over at least one traffic channel, said subscriber terminal receiving from said cell site an information signal having a predefined timing alignment; the method comprising the steps of:

scanning a plurality of traffic channels assigned for use by said cell site;

evaluating whether each of said traffic channels is being used to provide communications between said cell site and said subscriber terminal;

responsive to said evaluating step, determining for each active traffic channel whether the subscriber terminal using said traffic channel is within a predefined coverage region for said cell extender;

responsive to said coverage determining step, generating and transmitting a digital message to instruct said subscriber terminal to cease operating on said active traffic channel and to begin operating on a different traffic channel assigned for use by said cell extender; and controlling the time at which said digital message is transmitted to said subscriber terminal such that said message is actually received by said subscriber terminal with a timing alignment substantially identical to that of said cell site information signal.

36. In a cell extender for use in a digital cellular telephone system having at least one cell site and at least one subscriber terminal, said cell site being receptive to signals from said subscriber terminal only during predefined time slot intervals of cyclically recurring transmission frames, the method of controlling the relative timing of said signals received by said cell site from said subscriber terminal with respect to said intervals comprising the steps of:

providing said cell extender with a timing parameter corresponding to the known propagation delay of radio-frequency signals traveling between said cell site and said cell extender;

said cell extender applying a timing advance corresponding to said timing parameter to the transmissions of said cell extender to said subscriber terminal to compensate for said known propagation delay; and said subscriber terminal timing its transmissions responsive to its observations of the transmissions of said cell extender such that said subscriber terminal transmissions arrive at said cell site during said predefined time slot intervals.

37. For use with digital-capable cellular telephone system having a cell extender, at least one cell site associated with said cell extender, and at least one subscriber terminal, said cell site being allocated a first set of channels, said cell extender being allocated a second set of channels, the method of enabling a subscriber terminal located within a predefined coverage area of said cell extender to engage in a telephone call through said cell site with said cell extender acting as a communications intermediary comprising the steps of:

said cell extender obtaining a timing adjustment parameter;

said cell extender observing a signal transmitted by said subscriber terminal to detect attempts by said subscriber terminal to begin a call;

said cell extender determining whether said subscriber terminal is capable of operating on a digital channel;

said cell extender observing a signal transmitted by said cell site to detect an instruction in said signal to assign said subscriber terminal to use one of said channels allocated to said cell site;

said cell extender translating said instruction to reassign said subscriber terminal to use one said channels allocated to said cell extender; and said cell extender adjusting the timing of a signal transmitted to said subscriber terminal with respect to a signal received from said cell site according to said timing adjustment parameter.

38. The method of claim 37 further comprising the steps of:

said cell site measuring the timing of a signal transmitted by said subscriber unit retransmitted by said cell extender, with respect to signals transmitted by said cell extender;

said cell site transmitting an instruction to said subscriber unit to alter the timing of signals transmitted by said subscriber unit to arrive at said cell site within a desired timing interval.

39. The method of claim 37 wherein the step of said cell extender obtaining a timing adjustment parameter comprises the step of:

said cell extender obtaining a first timing advance parameter associated with a known distance between said cell extender and said cell site.

40. The method of claim 37 wherein the step of said cell extender obtaining a timing adjustment parameter comprises the step of:

said cell extender obtaining a second timing advance parameter corresponding to an estimated distance between said subscriber terminal and said cell extender, said estimated distance being a function of a measured strength of a signal transmitted by said subscriber terminal.

41. For use in a digital-capable cellular telephone system comprising at least one cell site; a cell extender associated with the cell site; and at least one subscriber terminal; the cell extender acting as a communications intermediary between the cell site and the subscriber terminal during a call; the cell site transmitting forward traffic on a first channel; the cell extender receiving the forward traffic on the first channel and retransmitting it on a second channel; the subscriber terminal receiving the forward traffic on the second channel; the subscriber terminal transmitting reverse traffic on a third channel; the cell extender receiving the reverse traffic on the third channel and retransmitting it on a fourth channel; the cell site receiving the reverse traffic on the fourth channel; the cell site transmitting information destined for the subscriber terminal only during predefined time slots assigned to that subscriber terminal within cyclically occurring transmit timing frames; the cell site receptive to information from the subscriber terminal only during corresponding time slots assigned to said subscriber terminal within cyclically occurring receive timing frames; the subscriber terminal timing its transmissions of reverse traffic responsive to the timing of the forward traffic as received thereby; the method of controlling the cell extender comprising the steps of:

adjusting the timing of said cell extender transmissions on said second channel with respect to the timing of said cell site transmissions on said first channel by:

determining an effective additional propagation delay caused by the operation of said cell extender as a communications intermediary between said cell site and said subscriber terminal;

applying an effective timing advance to said cell extender transmissions on said second channel with respect to the timing of said cell site transmissions on said first channel to negate said effective additional propagation delay;

such that said reverse traffic transmitted by said subscriber terminal and retransmitted by said cell extender actually arrives at said cell site during said corresponding time slots.

42. For use in a digital-capable cellular telephone system comprising at least one cell site; a cell extender associated with the cell site; and at least one subscriber terminal; the cell extender acting as a communications intermediary between the cell site and the subscriber terminal during a call; the cell site transmitting forward traffic on a first channel; the cell extender receiving the forward traffic on the first channel and retransmitting it on a second channel; the subscriber terminal receiving the forward traffic on the second channel; the subscriber terminal transmitting reverse traffic on a third channel; the cell extender receiving the reverse traffic on the third channel and retransmitting it on a fourth channel; the cell site receiving the reverse traffic on the fourth channel; the cell site transmitting information destined for the subscriber terminal only during predefined time slots assigned to that subscriber terminal within cyclically occurring transmit timing frames; the cell site receptive to information from the subscriber terminal only during corresponding time slots assigned to said subscriber terminal within cyclically occurring receive timing frames; the subscriber terminal timing its transmissions of reverse traffic responsive to the timing of the forward traffic as received thereby; the method of controlling the cell extender comprising the steps of:

adjusting the timing of said cell extender transmissions on said second channel with respect to the timing of said cell site transmissions on said first channel by:

determining a first delay parameter corresponding to an RF path propagation delay associated with the distance between said cell site and said cell extender;

determining a second delay parameter corresponding to an RF path propagation delay associated with an estimated distance between said cell extender and said subscriber terminal; and applying an effective timing advance to said cell extender transmissions on said second channel with respect to the timing of said cell site transmissions on said first channel, said timing advance being responsive to said first and second delay parameters;

such that said reverse traffic transmitted by said subscriber terminal and retransmitted by said cell extender actually arrives at said cell site during said corresponding time slots.

43. The method of claim 42, wherein said step of applying an effective timing advance to said cell extender transmissions further comprises the step of delaying said cell extender transmissions on said second channel by an amount equivalent to the time between said predefined time slots less said timing advance to cause said reverse traffic transmission intended by said subscriber terminal to arrive at said cell site aligned with a particular corresponding time slot to actually arrive at said cell site aligned with a later time slot assigned to said subscriber terminal.

* * * * *